(12) United States Patent
Kurganov

(10) Patent No.: US 9,912,628 B2
(45) Date of Patent: *Mar. 6, 2018

(54) COMPUTER, INTERNET AND TELECOMMUNICATIONS BASED NETWORK

(71) Applicant: Parus Holdings, Inc., Bannockburn, IL (US)

(72) Inventor: Alexander Kurganov, Buffalo Grove, IL (US)

(73) Assignee: Parus Holdings, Inc., Bannockburn, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,138

(22) Filed: Sep. 22, 2014

(65) Prior Publication Data

US 2015/0081289 A1    Mar. 19, 2015

Related U.S. Application Data

(63) Continuation of application No. 13/944,732, filed on Jul. 17, 2013, now Pat. No. 8,843,141, which is a
(Continued)

(51) Int. Cl.
*H04L 12/58* (2006.01)
*H04L 29/06* (2006.01)
(Continued)

(52) U.S. Cl.
CPC ............. *H04L 51/36* (2013.01); *G06F 3/167* (2013.01); *G06F 17/3061* (2013.01);
(Continued)

(58) Field of Classification Search
CPC .......... G06F 15/16; G06F 17/30; G06F 21/53; H04L 67/10; H04L 29/06; H04L 51/36;
(Continued)

(56) References Cited

U.S. PATENT DOCUMENTS

| 174,465 A | 3/1876 | Bell |
| 3,728,486 A | 4/1973 | Kraus |

(Continued)

FOREIGN PATENT DOCUMENTS

| CA | 1329852 | 5/1994 |
| EP | 0 572 544 | 9/1996 |

(Continued)

OTHER PUBLICATIONS

"A PABX that Listens and Talks", Speech Technology, Jan. /Feb. 1984, pp. 74-79.
(Continued)

*Primary Examiner* — Inder Mehra
(74) *Attorney, Agent, or Firm* — Patent Law Works LLP

(57) ABSTRACT

A method and apparatus for a computer and telecommunication network which can receive, send and manage information from or to a subscriber of the network, based on the subscriber's configuration. The network is made up of at least one cluster containing voice servers which allow for telephony, speech recognition, text-to-speech and conferencing functions, and is accessible by the subscriber through standard telephone connections or through internet connections. The network also utilizes a database and file server allowing the subscriber to maintain and manage certain contact lists and administrative information. A web server is also connected to the cluster thereby allowing access to all functions through internet connections.

44 Claims, 27 Drawing Sheets

Related U.S. Application Data continuation of application No. 13/784,779, filed on Mar. 4, 2013, now Pat. No. 8,838,074, which is a continuation of application No. 13/350,712, filed on Jan. 13, 2012, now Pat. No. 8,843,120, which is a continuation of application No. 12/697,869, filed on Feb. 1, 2010, now Pat. No. 8,098,600, which is a continuation of application No. 10/877,366, filed on Jun. 25, 2004, now abandoned, which is a continuation of application No. 09/033,335, filed on Mar. 2, 1998, now Pat. No. 6,775,264.

(60) Provisional application No. 60/040,056, filed on Mar. 3, 1997.

(51) Int. Cl.

| | | |
|---|---|---|
| *H04L 29/12* | (2006.01) | |
| *G10L 15/00* | (2013.01) | |
| *G10L 17/22* | (2013.01) | |
| *H04M 3/436* | (2006.01) | |
| *H04M 3/51* | (2006.01) | |
| *H04M 3/53* | (2006.01) | |
| *G10L 21/00* | (2013.01) | |
| *G10L 25/48* | (2013.01) | |
| *G06F 3/16* | (2006.01) | |
| *H04M 1/725* | (2006.01) | |
| *H04W 4/12* | (2009.01) | |
| *G06F 17/30* | (2006.01) | |
| *H04M 7/00* | (2006.01) | |
| *H04M 3/42* | (2006.01) | |
| *H04M 3/56* | (2006.01) | |
| *H04M 7/12* | (2006.01) | |
| *H04L 29/08* | (2006.01) | |

(52) U.S. Cl.
CPC ........ *G06F 17/30286* (2013.01); *G10L 15/00* (2013.01); *G10L 17/22* (2013.01); *G10L 21/00* (2013.01); *G10L 25/48* (2013.01); *H04L 29/06* (2013.01); *H04L 29/1215* (2013.01); *H04L 29/1216* (2013.01); *H04L 51/00* (2013.01); *H04L 61/157* (2013.01); *H04L 61/1564* (2013.01); *H04M 1/72527* (2013.01); *H04M 3/42153* (2013.01); *H04M 3/436* (2013.01); *H04M 3/51* (2013.01); *H04M 3/515* (2013.01); *H04M 3/53* (2013.01); *H04M 7/0033* (2013.01); *H04W 4/12* (2013.01); *H04L 67/42* (2013.01); *H04L 69/08* (2013.01); *H04L 69/329* (2013.01); *H04M 3/42* (2013.01); *H04M 3/56* (2013.01); *H04M 7/12* (2013.01); *H04M 2201/40* (2013.01); *H04M 2201/60* (2013.01); *H04M 2203/4509* (2013.01)

(58) Field of Classification Search
CPC ... H04L 61/1564; H04L 69/329; H04L 12/58; H04L 12/589; H04L 29/1215; H04L 29/1216; H04L 61/157; H04L 67/42; H04L 69/08; H04L 12/5835; H04L 51/066; H04L 67/00; H04W 4/12; H04M 7/0033; H04M 1/72527
USPC ............ 455/466, 412.1, 413, 517, 415, 461, 455/456.1, 67.11, 556.1, 557, 559; 370/352, 260, 259, 389, 390, 392; 709/204, 206, 707; 379/93.24, 100.07, 379/100.08, 201.1, 93.07, 93.29, 88.13; 340/7.21, 7.29, 7.31, 7.51
See application file for complete search history.

(56) References Cited

U.S. PATENT DOCUMENTS

| | | |
|---|---|---|
| 4,058,838 A | 11/1977 | Crager et al. |
| 4,100,377 A | 7/1978 | Flanagan |
| 4,158,750 A | 6/1979 | Sakoe et al. |
| 4,313,035 A | 1/1982 | Jordan et al. |
| 4,327,251 A | 4/1982 | Fomenko et al. |
| 4,340,783 A | 7/1982 | Sugiyama et al. |
| 4,340,797 A | 7/1982 | Takano et al. |
| 4,340,800 A | 7/1982 | Ueda et al. |
| 4,371,752 A | 2/1983 | Matthews et al. |
| 4,481,574 A | 11/1984 | DeFino et al. |
| 4,489,438 A | 12/1984 | Hughes |
| 4,500,751 A | 2/1985 | Darland et al. |
| 4,513,390 A | 4/1985 | Walter et al. |
| 4,523,055 A | 6/1985 | Hohl et al. |
| 4,549,047 A | 10/1985 | Brian et al. |
| 4,584,434 A | 4/1986 | Hashimoto |
| 4,585,906 A | 4/1986 | Matthews et al. |
| 4,596,900 A | 6/1986 | Jackson |
| 4,602,129 A | 7/1986 | Matthews et al. |
| 4,635,253 A | 1/1987 | Urui et al. |
| 4,652,700 A | 3/1987 | Matthews |
| 4,696,028 A | 9/1987 | Morganstein et al. |
| 4,713,837 A | 12/1987 | Gordon |
| 4,747,127 A | 5/1988 | Hansen et al. |
| 4,748,656 A | 5/1988 | Gibbs et al. |
| 4,755,932 A | 7/1988 | Diedrich |
| 4,757,525 A | 7/1988 | Matthews et al. |
| 4,761,807 A | 8/1988 | Matthews et al. |
| 4,763,317 A | 8/1988 | Lehman et al. |
| 4,769,719 A | 9/1988 | Endo |
| 4,771,425 A | 9/1988 | Baran et al. |
| 4,776,016 A | 10/1988 | Hansen |
| 4,782,517 A | 11/1988 | Bernardis et al. |
| 4,792,968 A | 12/1988 | Katz |
| 4,799,144 A | 1/1989 | Parruck |
| 4,809,321 A | 2/1989 | Morganstein et al. |
| 4,811,381 A | 3/1989 | Woo et al. |
| 4,837,798 A | 6/1989 | Cohen et al. |
| 4,847,891 A | 7/1989 | Kotani |
| 4,850,012 A | 7/1989 | Mehta et al. |
| 4,852,149 A | 7/1989 | Zwick et al. |
| 4,852,170 A | 7/1989 | Bordeaux |
| 4,866,758 A | 9/1989 | Heinzelmann |
| 4,873,719 A | 10/1989 | Reese |
| 4,879,743 A | 11/1989 | Burke et al. |
| 4,893,333 A | 1/1990 | Baran et al. |
| 4,893,335 A | 1/1990 | Fuller et al. |
| 4,903,289 A | 2/1990 | Hashimoto |
| 4,903,291 A | 2/1990 | Tsurufuji et al. |
| 4,905,273 A | 2/1990 | Gordon et al. |
| 4,907,079 A | 3/1990 | Turner et al. |
| 4,918,722 A | 4/1990 | Duehren et al. |
| 4,922,518 A | 5/1990 | Gordon et al. |
| 4,922,520 A | 5/1990 | Bernard et al. |
| 4,922,526 A | 5/1990 | Morganstein et al. |
| 4,926,462 A | 5/1990 | Ladd et al. |
| 4,930,150 A | 5/1990 | Katz |
| 4,933,966 A | 6/1990 | Hird et al. |
| 4,935,955 A | 6/1990 | Neudorfer |
| 4,935,958 A | 6/1990 | Morganstein et al. |
| 4,941,170 A | 7/1990 | Herbst |
| 4,942,598 A | 7/1990 | Davis |
| 4,953,204 A | 8/1990 | Cuschleg, Jr. et al. |
| 4,955,047 A | 9/1990 | Morganstein et al. |
| 4,956,835 A | 9/1990 | Grover |
| 4,959,854 A | 9/1990 | Cave et al. |
| 4,967,288 A | 10/1990 | Mizutori et al. |
| 4,969,184 A | 11/1990 | Gordon et al. |
| 4,972,462 A | 11/1990 | Shibata |
| 4,974,254 A | 11/1990 | Perine et al. |
| 4,975,941 A | 12/1990 | Morganstein et al. |
| 4,985,913 A | 1/1991 | Shalom et al. |
| 4,994,926 A | 2/1991 | Gordon et al. |
| 4,996,704 A | 2/1991 | Brunson |
| 5,003,575 A | 3/1991 | Chamberlin et al. |

(56) References Cited

U.S. PATENT DOCUMENTS

| | | |
|---|---|---|
| 5,003,577 A | 3/1991 | Ertz |
| 5,008,926 A | 4/1991 | Misholi |
| 5,020,095 A | 5/1991 | Morganstein et al. |
| 5,027,384 A | 6/1991 | Morganstein |
| 5,029,196 A | 7/1991 | Morganstein |
| 5,036,533 A | 7/1991 | Carter et al. |
| 5,054,054 A | 10/1991 | Pessia et al. |
| 5,065,254 A | 11/1991 | Hishida |
| 5,086,385 A | 2/1992 | Launey et al. |
| 5,095,445 A | 3/1992 | Sekiguchi |
| 5,099,509 A | 3/1992 | Morganstein et al. |
| 5,109,405 A | 4/1992 | Morganstein |
| 5,128,984 A | 7/1992 | Katz |
| 5,131,024 A | 7/1992 | Pugh et al. |
| 5,133,004 A | 7/1992 | Heileman, Jr. et al. |
| 5,145,452 A | 9/1992 | Chevalier |
| 5,146,452 A | 9/1992 | Pekarske |
| 5,166,974 A | 11/1992 | Morganstein et al. |
| 5,179,585 A | 1/1993 | MacMillan, Jr. et al. |
| 5,193,110 A | 3/1993 | Jones et al. |
| 5,195,086 A | 3/1993 | Baumgartner et al. |
| 5,233,600 A | 8/1993 | Pekarske |
| 5,243,643 A | 9/1993 | Sattar et al. |
| 5,243,645 A | 9/1993 | Bissell et al. |
| 5,249,219 A | 9/1993 | Morganstein et al. |
| 5,255,305 A | 10/1993 | Sattar |
| 5,263,084 A | 11/1993 | Chaput et al. |
| 5,276,729 A | 1/1994 | Higuchi et al. |
| 5,287,199 A | 2/1994 | Zoccolillo |
| 5,291,302 A | 3/1994 | Gordon et al. |
| 5,291,479 A | 3/1994 | Vaziri et al. |
| 5,303,298 A | 4/1994 | Morganstein et al. |
| 5,307,399 A | 4/1994 | Dai et al. |
| 5,309,504 A | 5/1994 | Morganstein et al. |
| 5,325,421 A | 6/1994 | Hou et al. |
| 5,327,486 A | 7/1994 | Wolff et al. |
| 5,327,529 A | 7/1994 | Fults et al. |
| 5,329,578 A | 7/1994 | Brennan et al. |
| 5,333,266 A | 7/1994 | Boaz et al. |
| 5,347,574 A | 9/1994 | Morganstein |
| 5,355,403 A | 10/1994 | Richardson, Jr. et al. |
| 5,359,598 A | 10/1994 | Steagall et al. |
| 5,365,524 A | 11/1994 | Hiller et al. |
| 5,365,574 A | 11/1994 | Hunt et al. |
| 5,375,161 A | 12/1994 | Fuller et al. |
| 5,384,771 A | 1/1995 | Isidoro et al. |
| 5,404,231 A | 4/1995 | Bloomfield |
| 5,408,526 A | 4/1995 | McFarland et al. |
| 5,414,754 A | 5/1995 | Pugh et al. |
| 5,416,834 A | 5/1995 | Bales et al. |
| 5,426,421 A | 6/1995 | Gray |
| 5,432,845 A | 7/1995 | Burd et al. |
| 5,436,963 A | 7/1995 | Fitzpatrick et al. |
| 5,459,584 A | 10/1995 | Gordon et al. |
| 5,463,684 A | 10/1995 | Morduch et al. |
| 5,475,791 A | 12/1995 | Schalk et al. |
| 5,479,487 A | 12/1995 | Hammond |
| 5,495,484 A | 2/1996 | Self et al. |
| 5,497,373 A | 3/1996 | Hulen et al. |
| 5,499,288 A | 3/1996 | Hunt et al. |
| 5,515,427 A | 5/1996 | Carlsen et al. |
| 5,517,558 A | 5/1996 | Schalk |
| 5,526,353 A | 6/1996 | Henley et al. |
| 5,533,115 A | 7/1996 | Hollenbach et al. |
| 5,537,461 A | 7/1996 | Bridges et al. |
| 5,555,100 A | 9/1996 | Bloomfield et al. |
| 5,559,611 A | 9/1996 | Bloomfield et al. |
| 5,559,859 A | 9/1996 | Dai et al. |
| 5,566,236 A | 10/1996 | MeLampy et al. |
| 5,603,031 A | 2/1997 | White et al. |
| 5,608,786 A | 3/1997 | Gordon |
| 5,610,910 A | 3/1997 | Focsaneanu et al. |
| 5,610,970 A | 3/1997 | Fuller et al. |
| 5,611,031 A | 3/1997 | Hertzfeld et al. |
| 5,630,079 A | 5/1997 | McLaughlin |
| 5,652,789 A | 7/1997 | Miner et al. |
| 5,657,376 A | 8/1997 | Espeut et al. |
| 5,659,597 A | 8/1997 | Bareis et al. |
| 5,666,401 A | 9/1997 | Morganstein et al. |
| 5,675,507 A | 10/1997 | Bobo, II |
| 5,675,811 A | 10/1997 | Broedner et al. |
| 5,689,669 A | 11/1997 | Lynch et al. |
| 5,692,187 A | 11/1997 | Goldman et al. |
| 5,712,903 A | 1/1998 | Bartholomew et al. |
| 5,719,921 A | 2/1998 | Vysotsky et al. |
| 5,721,908 A | 2/1998 | Lagarde et al. |
| 5,724,408 A | 3/1998 | Morganstein |
| 5,729,659 A | 3/1998 | Potter |
| 5,737,395 A | 4/1998 | Irribarren |
| 5,742,596 A | 4/1998 | Baratz et al. |
| 5,742,905 A | 4/1998 | Pepe et al. |
| 5,752,191 A | 5/1998 | Fuller et al. |
| 5,758,322 A | 5/1998 | Rongley |
| 5,761,294 A | 6/1998 | Shaffer et al. |
| 5,764,639 A | 6/1998 | Staples et al. |
| 5,764,736 A | 6/1998 | Shachar et al. |
| 5,764,910 A | 6/1998 | Shachar |
| 5,774,860 A | 6/1998 | Bayya et al. |
| 5,787,298 A | 7/1998 | Broedner et al. |
| 5,793,993 A | 8/1998 | Broedner et al. |
| 5,794,205 A | 8/1998 | Walters |
| 5,796,791 A | 8/1998 | Polcyn |
| 5,799,063 A | 8/1998 | Krane |
| 5,799,065 A | 8/1998 | Junqua et al. |
| 5,809,282 A | 9/1998 | Cooper et al. |
| 5,809,481 A | 9/1998 | Baron et al. |
| 5,812,796 A | 9/1998 | Broedner et al. |
| 5,819,220 A | 10/1998 | Sarukkai et al. |
| 5,819,306 A | 10/1998 | Goldman et al. |
| 5,822,727 A | 10/1998 | Garberg et al. |
| 5,823,879 A | 10/1998 | Goldberg et al. |
| 5,832,063 A | 11/1998 | Vysotsky et al. |
| 5,832,440 A | 11/1998 | Woodbridge et al. |
| 5,835,570 A | 11/1998 | Wattenbarger |
| 5,838,682 A | 11/1998 | Dekelbaum et al. |
| 5,867,494 A | 2/1999 | Krishnaswamy et al. |
| 5,867,495 A | 2/1999 | Elliott et al. |
| 5,870,550 A | 2/1999 | Wesinger, Jr. et al. |
| 5,873,080 A | 2/1999 | Coden et al. |
| 5,881,134 A | 3/1999 | Foster et al. |
| 5,881,135 A | 3/1999 | Watts |
| 5,884,032 A | 3/1999 | Bateman et al. |
| 5,884,262 A | 3/1999 | Wise et al. |
| 5,890,123 A | 3/1999 | Brown et al. |
| 5,905,476 A | 5/1999 | McLaughlin et al. |
| 5,914,951 A | 6/1999 | Bentley et al. |
| 5,915,001 A | 6/1999 | Uppaluru |
| 5,917,817 A | 6/1999 | Dunn et al. |
| 5,940,598 A | 8/1999 | Strauss |
| 5,943,399 A | 8/1999 | Bannister et al. |
| 5,946,389 A | 8/1999 | Dold |
| 5,953,392 A | 9/1999 | Rhie et al. |
| 5,974,124 A | 10/1999 | Schlueter, Jr. et al. |
| 5,974,413 A | 10/1999 | Beauregard et al. |
| 5,991,292 A | 11/1999 | Focsaneanu et al. |
| 5,995,615 A | 11/1999 | Miloslavsky |
| 5,999,525 A | 12/1999 | Krishnaswamy et al. |
| 5,999,611 A | 12/1999 | Tatchell et al. |
| 5,999,965 A | 12/1999 | Kelly |
| 6,012,088 A * | 1/2000 | Li .................. G06F 9/44505 709/219 |
| 6,014,437 A | 1/2000 | Acker et al. |
| 6,014,626 A * | 1/2000 | Cohen ............... G06F 19/3418 704/271 |
| 6,018,710 A | 1/2000 | Wynblatt et al. |
| 6,021,181 A | 2/2000 | Miner et al. |
| 6,021,190 A | 2/2000 | Fuller et al. |
| 6,031,904 A | 2/2000 | An et al. |
| 6,038,305 A | 3/2000 | McAllister et al. |
| 6,044,107 A | 3/2000 | Gatherer et al. |
| 6,047,053 A | 4/2000 | Miner et al. |
| 6,052,372 A | 4/2000 | Gittins et al. |
| 6,067,516 A | 5/2000 | Levay et al. |
| 6,078,580 A | 6/2000 | Mandalia et al. |

(56) References Cited

U.S. PATENT DOCUMENTS

| | | | |
|---|---|---|---|
| 6,081,518 A | 6/2000 | Bowman-Amuah | |
| 6,081,782 A | 6/2000 | Rabin | |
| 6,091,808 A | 7/2000 | Wood et al. | |
| 6,101,472 A | 8/2000 | Giangarra et al. | |
| 6,104,803 A * | 8/2000 | Weser | H04Q 3/0025 379/220.01 |
| 6,115,737 A | 9/2000 | Ely et al. | |
| 6,115,742 A | 9/2000 | Franklin et al. | |
| 6,130,933 A | 10/2000 | Miloslavsky | |
| 6,131,095 A | 10/2000 | Low et al. | |
| 6,137,863 A * | 10/2000 | Brown | G10L 15/18 379/88.01 |
| 6,157,705 A | 12/2000 | Perrone | |
| 6,161,128 A | 12/2000 | Smyk | |
| 6,178,399 B1 | 1/2001 | Takebayashi et al. | |
| 6,185,535 B1 | 2/2001 | Hedin et al. | |
| 6,188,683 B1 | 2/2001 | Lang et al. | |
| 6,195,357 B1 | 2/2001 | Polcyn | |
| 6,199,076 B1 | 3/2001 | Logan et al. | |
| 6,201,814 B1 | 3/2001 | Greenspan | |
| 6,201,863 B1 | 3/2001 | Miloslavsky | |
| 6,208,638 B1 | 3/2001 | Rieley et al. | |
| 6,215,858 B1 | 4/2001 | Bartholomew et al. | |
| 6,230,132 B1 | 5/2001 | Class et al. | |
| 6,233,318 B1 * | 5/2001 | Picard | H04L 12/5835 379/88.12 |
| 6,243,373 B1 | 6/2001 | Turock | |
| 6,252,944 B1 | 6/2001 | Hansen, II et al. | |
| 6,269,336 B1 | 7/2001 | Ladd et al. | |
| 6,285,745 B1 | 9/2001 | Bartholomew et al. | |
| 6,327,572 B1 | 12/2001 | Morton et al. | |
| 6,330,538 B1 | 12/2001 | Breen | |
| 6,349,132 B1 | 2/2002 | Wesemann et al. | |
| 6,353,661 B1 | 3/2002 | Bailey, III | |
| 6,366,575 B1 | 4/2002 | Barkan et al. | |
| 6,366,578 B1 | 4/2002 | Johnson | |
| 6,424,945 B1 | 7/2002 | Sorsa | |
| 6,430,282 B1 | 8/2002 | Bannister et al. | |
| 6,434,529 B1 | 8/2002 | Walker et al. | |
| 6,445,694 B1 | 9/2002 | Swartz | |
| 6,446,076 B1 | 9/2002 | Burkey et al. | |
| 6,456,699 B1 | 9/2002 | Burg et al. | |
| 6,459,910 B1 | 10/2002 | Houston | |
| 6,477,240 B1 | 11/2002 | Lim et al. | |
| 6,490,627 B1 | 12/2002 | Kaira et al. | |
| 6,505,163 B1 | 1/2003 | Zhang et al. | |
| 6,529,948 B1 | 3/2003 | Bowman-Amuah | |
| 6,532,444 B1 | 3/2003 | Weber | |
| 6,539,359 B1 | 3/2003 | Ladd et al. | |
| 6,546,393 B1 | 4/2003 | Khan | |
| 6,560,604 B1 | 5/2003 | Fascenda | |
| 6,584,439 B1 | 6/2003 | Geilhufe et al. | |
| 6,593,944 B1 | 7/2003 | Nicolas et al. | |
| 6,594,348 B1 | 7/2003 | Bjurstrom et al. | |
| 6,594,692 B1 * | 7/2003 | Reisman | G06F 8/65 705/26.1 |
| 6,618,039 B1 | 9/2003 | Grant et al. | |
| 6,618,726 B1 | 9/2003 | Colbath et al. | |
| 6,618,763 B1 | 9/2003 | Steinberg | |
| 6,636,831 B1 | 10/2003 | Profit, Jr. et al. | |
| 6,654,814 B1 | 11/2003 | Britton et al. | |
| 6,658,662 B1 | 12/2003 | Nielsen | |
| 6,665,640 B1 | 12/2003 | Bennett et al. | |
| 6,687,341 B1 | 2/2004 | Koch et al. | |
| 6,704,024 B2 | 3/2004 | Robotham et al. | |
| 6,718,015 B1 | 4/2004 | Berstis | |
| 6,721,705 B2 | 4/2004 | Kurganov et al. | |
| 6,732,142 B1 | 5/2004 | Bates et al. | |
| 6,763,388 B1 | 7/2004 | Tsimelzon | |
| 6,771,732 B2 | 8/2004 | Xiao et al. | |
| 6,775,264 B1 * | 8/2004 | Kurganov | H04W 4/12 370/352 |
| 6,785,266 B2 | 8/2004 | Swartz | |
| 6,807,257 B1 | 10/2004 | Kurganov | |
| 6,812,939 B1 | 11/2004 | Flores et al. | |
| 6,823,370 B1 | 11/2004 | Kredo et al. | |
| 6,888,929 B1 | 5/2005 | Saylor et al. | |
| 6,922,733 B1 | 7/2005 | Kuiken et al. | |
| 6,941,273 B1 | 9/2005 | Loghmani et al. | |
| 6,964,012 B1 | 11/2005 | Zimgibl et al. | |
| 6,964,023 B2 | 11/2005 | Maes et al. | |
| 6,965,864 B1 | 11/2005 | Thrift et al. | |
| 6,996,609 B2 | 2/2006 | Hickman et al. | |
| 6,999,804 B2 | 2/2006 | Engstrom et al. | |
| 7,024,464 B1 | 4/2006 | Lusher et al. | |
| 7,050,977 B1 | 5/2006 | Bennett | |
| 7,075,555 B1 | 7/2006 | Flores et al. | |
| 7,076,431 B2 | 7/2006 | Kurganov et al. | |
| 7,089,307 B2 | 8/2006 | Zintel et al. | |
| 7,145,898 B1 | 12/2006 | Elliott | |
| 7,327,723 B2 | 2/2008 | Kurganov | |
| 7,386,455 B2 | 6/2008 | Kurganov et al. | |
| 7,516,190 B2 | 4/2009 | Kurganov | |
| 7,881,941 B2 | 2/2011 | Kurganov et al. | |
| 8,098,600 B2 * | 1/2012 | Kurganov | H04W 4/12 370/260 |
| 8,185,402 B2 | 5/2012 | Kurganov et al. | |
| 8,838,074 B2 * | 9/2014 | Kurganov | H04W 4/12 370/260 |
| 8,843,120 B2 * | 9/2014 | Kurganov | H04W 4/12 370/259 |
| 8,843,141 B2 * | 9/2014 | Kurganov | H04W 4/12 370/260 |
| 2001/0032234 A1 | 10/2001 | Summers et al. | |
| 2001/0040885 A1 | 11/2001 | Jonas et al. | |
| 2001/0048676 A1 | 12/2001 | Jimenez et al. | |
| 2002/0006126 A1 | 1/2002 | Johnson et al. | |
| 2002/0059402 A1 | 5/2002 | Belanger | |
| 2002/0064149 A1 | 5/2002 | Elliott et al. | |
| 2002/0090114 A1 | 7/2002 | Rhoads et al. | |
| 2004/0160913 A1 | 8/2004 | Kubler et al. | |
| 2005/0025133 A1 | 2/2005 | Swartz | |
| 2005/0030179 A1 | 2/2005 | Script et al. | |
| 2005/0074104 A1 * | 4/2005 | Swartz | H04L 12/58 379/142.08 |
| 2006/0069926 A1 | 3/2006 | Ginter et al. | |

FOREIGN PATENT DOCUMENTS

| | | |
|---|---|---|
| EP | 0794650 | 9/1997 |
| GB | 2 211 698 | 7/1989 |
| GB | 2 240 693 | 8/1991 |
| GB | 2317782 | 4/1998 |
| JP | 1-258526 | 10/1989 |
| WO | WO 91/07838 | 5/1991 |
| WO | WO 91/18466 | 11/1991 |
| WO | WO 96/09710 | 3/1996 |
| WO | 9734401 | 9/1997 |
| WO | WO 97/37481 | 9/1997 |
| WO | WO 98/23058 | 5/1998 |
| WO | 9823058 | 9/1998 |

OTHER PUBLICATIONS

"Business Phone Systems for Advanced Offices", NTT Review, vol. 2 (6), Nov. 1990, pp. 52-54.

"Data Communications Networks: Message Handling Systems", Fasciele, VIII. 7—Recommendations X.400-X.430, 42 pages, date unknown.

"Faxpak Store and Forward Facsimile Transmission Service", Electrical Communication, vol. 54 (3), 1979, pp. 251-255.

"GLOBECOM '85 IEEE Global Telecommunications Conference," New Orleans, LA., Dec. 2-5, 1985, pp. 1295-1300.

"Introducing PIC SuperFax, First PC/Fax System to Run Under Windows", Pacific Image Communications, Pasadena, CA, Date Unknown, (received at COMDEX show, Nov. 3, 1987). 3 pgs.

"PureSpeech Announces Juggler PC System for First Quarter of 1997", High Beam Research, Sep. 19, 1996, pp. 1-3, available at http://www.highbeam.comldoc/1G1-186909545.html (accessed on Dec. 8, 2006).

(56) References Cited

OTHER PUBLICATIONS

"PureSpeech's Juggler", Teleconnect, Dec. 1996 issue, p. 36.
"Secretarial Branch Exchange", IBM Technical Disclosure Bulletin, vol. 26 (5), Oct. 1983, pp. 2645-2647.
"The VMX Systems Product Reference Manual: Product Description Volume", May 1994, vol. 1, release 7.1, VMX, Inc. (Octel Communications Corp.) San Jose, CA, USA.
"VMXworks Product Reference Manual: vol. 3 Programmer's Guide", Jul. 1994, vols. 3 & 4, Release 3.1, Octel Communications Corp.) Milpitas, CA, USA.
"Wildfire Communication, Inc.", Harvard Business School, Mar. 21, 1996, Publ. No. 9-396-305, pp. 1-22.
"WordPerfect: New Telephony Features Boost Office", WordPerfect Office TechBrief, 1994, Info-World Publishing Co., vol. 10, Issue 2, pp. 2-3.
AT&T, Press Release, "AT&T Customers Can Teach Systems to Listen and Respond to Voice", Jan. 17, 1995, pp. 1-2, Basking Ridge, NJ., available at www.lucent.com/press/0195/950117.gbb.html (accessed Mar. 15, 2005).
Bellcore Technology Licensing, "The Electronic Receptionist—A Knowledge-Based Approach to Personal Communications", 1994, pp. 1-8.
Brachman et al., "Fragmentation in Store-and-Forward Message Transfer", IEEE Communications Magazine, vol. 26(7), Jul. 1998, pp. 18-27.
Cole et al., "An Architecture for a Mobile OSI Mail Access System", IEEE Journal on Selected Areas in Communications, vol. 7 (2), Feb. 1989, pp. 249-256.
DAX Systems, Inc., Press Release, "Speech Recognition Success in DAX's Grasp", Nov. 22, 1995, pp. 1-2, Pine Brook, NJ.
Garcia et al., "Issue in Multimedia Computer-Based Message Systems Design and Standardization", NATO ASI Series, vol. 1-6, 1984, 10 pgs.
Hunt et al., "Long-Distance Remote Control to the Rescue", Chicago Tribune, Jun. 15, 2002, Section 4, p. 15.
Ly, "Chatter: A Conversational Telephone Agent", submitted to Program in Media Arts, & Sciences, MIT, 1993, pp. 1-130.
Maeda, et al., "An Intelligent Customer-Controlled Switching System", IEEE Global Telecommunications Conference, Hollywood, Florida, Nov. 28-Dec. 1, 1988, pp. 1499-1503.
Markowitz, J., "The Ultimate Computer Input Device May Be Right Under Your Nose", Byte, Dec. 1995, pp. 1-13, available at www.byte.com/art/9512/sec8/art1.htm (accessed Mar. 15, 2005).
Print outs of Internet web site, "Wildfire Communications, Inv.,", Nov. 5, 1997, including printouts of the following web pages: http://www.wildfire.com; http://www.wildfire.com/consumerhome.html; http://www.wildfire.com/106.html; http://www.wildfire.com/carrierhome.html; http://www.wildfire.com/sfandb.html; http://www.wildfire.com/about.html; http://www.wildfire.com/abtmgmt.html; http://www.wildfire.com/scoop.html; http://www.wildfire.com/intel.html; and http://www.wildfire.com/msft.html.

Schmandt et al., "A Conversational Telephone Messaging Systems", IEEE Transactions on Consumer Electronics, 1984, vol. CE-30, No. 3, pp. xxi-xxiv.
Schmandt, et al., "Phone Shell: The Telephone as Computer Terminal", ACM Multimedia, 1993, 11 pages.
Schmandt, et al., "Phone Slave: A Graphical Telecommunications Interface", Proceedings of the SID, 1985, vol. 26/1, pp. 79-82.
Shimamura, et al., "Review of the Electrical Communication Laboratories", vol. 418, (33), No. 1, Tokyo, Japan, 1985, pp. 31-39.
Examples: Abstract Ideas, 2014, 20 pages.
IBM AIX DirectTalk/6000 Version 1 Release 6 Improves Your Voice Processing Services to Callers and Customers, Announcement No. 295-489, Nov. 28, 1995, 27 pages.
IBM Announcement Letter No. A95-893, retrieved on Mar. 9, 2015, 10 pages.
IBM, AIX DirectTalk/6000 Release 6: Speech Recognition with the BBN Hark Recognizer, SC33-1734-00, Feb. 1996, 250 pages.
IBM, AIX DirectTalk/6000: General Information and Planning, Release 6, GC33-1720-00, Dec. 1995, 162 pages.
IBM, DirectTalkMail: Administration, Release 6, SC33-1733-00, Feb. 1996, 274 pages.
Newton, Harry, Newtons Telecom Dictionary—The Official Glossary of Telecommunications and Voice Processing Terms, Dec. 1992, 6 pages.
Paper No. 10, Denying Institution of Covered Business Method Patent Review CBM2015-00109 and CBM2015-00149, Nov. 9, 2015, 19 pages.
Paper No. 10, Denying Institution of Covered Business Method Patent Review CBM2015-00110 and CBM2015-00150, Nov. 9, 2015, 20 pages.
Paper No. 10, Denying Institution of Covered Business Method Patent Review CBM2015-00111 and CBM2015-00151, Nov. 9, 2015, 19 pages.
Paper No. 10, Denying Institution of Covered Business Method Patent Review CBM2015-00112 and CBM2015-00152, Nov. 9, 2015, 18 pages.
Putz, Steve, Interactive Information Services Using World-Wide Web Hypertext, First Int'l Conference on World-Wide Web (May 25-27, 1994), 10 pages.
Memorandum Opinion and Order, Oct. 8, 2015, 27 pages.
Update Subject Matter Eligibility, Jul. 2015, 33 pages.
Wikipedia Definition of "Internet", available at http://en.wikipedia.org/wiki/Internet. Retrieved on Feb. 10, 2016, pp. 24-26.
Opening Brief of Appellant Parus Holdings, Inc., submitted on Mar. 8, 2016, to the United States Court of Appeal for the Federal Circuit, 236 pages.
Judgment without Opinion for *Parus Holdings Inc., v. Sallie Mae Bank, Navient Solutions Inc., PNC Bank, N. A., Suntrust Bank, Suntrust Mortgage Inc.*, 2016-1179, 2016-1180, 2016-1181, entered Feb. 27, 2017 (2 pages).

\* cited by examiner

COMPUTER, INTERNET AND TELECOMMUNICATIONS BASED NETWORK

CROSS REFERENCE TO RELATED APPLICATIONS

This application is continuation of application Ser. No. 13/944,732, entitled, "Computer, Internet and Telecommunications Based Network," filed Jul. 17, 2013, which is a continuation of application Ser. No. 13/784,779, entitled, "Computer, Internet and Telecommunications Based Network," filed Mar. 4, 2013, which is a continuation of application Ser. No. 13/350,712, entitled "Computer, Internet and Telecommunications Based Network", filed Jan. 13, 2012, which is a continuation of application Ser. No. 12/697,869, entitled "Computer, Internet and Telecommunications Based Network", filed Feb. 1, 2010, now U.S. Pat. No. 8,098,600, which is a continuation of application Ser. No. 10/877,366, entitled "Computer, Internet and Telecommunications Based Network", filed Jun. 25, 2004, now abandoned, which is a continuation application of application Ser. No. 09/033,335, entitled "Computer, Internet and Telecommunications Based Network", filed Mar. 2, 1998, now U.S. Pat. No. 6,775,264, which claims priority to Application Ser. No. 60/040,056, entitled "Network and Voice Controlled Telephony Systems," filed Mar. 3, 1997, and assigned to the assignee of the present application. The subject matter in the above-identified co-pending and commonly owned applications is incorporated herein by reference.

FIELD OF THE INVENTION

The present invention relates to a telecommunication system, and more specifically, the present invention relates to a network system based on internet, computer and telecommunication standards, utilizing internet and computer technology, a graphical user interface, integrated telecommunication applications and interactive voice recognition technology, facilitating the computation and telecommunication of voice and electronic data.

BACKGROUND OF THE INVENTION

Individuals and business people seek to communicate with each other, obtain useful information, interact commercially and entertain themselves in an increasingly mobile society. In order to fulfill these needs, one requires the ability to send and receive messages, access information and entertainment, conduct business transactions, organize daily schedules and stay in touch with homes and offices from almost anywhere, at any time, as easily as making a telephone call.

Continued demand for products and services that address these needs is evidenced by the increasing number of electronic devices, and the explosive growth of the internet and network services. Advances in wireless telecommunication technologies led to the development of such devices as personal digital assistants, and enabled the growth of paging and cellular telephone networks. Devices such as notebook and sub-notebook computers with modems (both wireline and wireless) have allowed mobile professionals to connect to their PCs from almost any location, as well as to access on-line information and electronic mail services while traveling worldwide.

In addition, communication and information needs have stimulated the growth of the internet, on-line networks and corporate intranets. These networks now host a variety of services such as e-mail, database searching, conferencing, electronic commerce, games, software libraries and electronic newspapers and magazines. However, despite the proliferation of communication devices and the development of the internet, on-line networks and corporate intranets, significant barriers remain to fulfilling user needs for access to and management of personal, professional and public information.

The hardware designs and software technologies which enable today's communication are complex. Information, though widely available, can be either inaccessible or accessible only by navigating through a host of phone systems, operating system platforms, databases and networks. As a result significant amounts of time and effort are required of those who use and depend on these devices, networks and services to communicate and obtain information.

The problem of accessing and processing all of the information available from communication devices, networks and services is particularly acute for mobile business professionals. Today's mobile professional, working out of the home or small office, may have a cellular phone, a pager, a computer, a fax machine, an electronic mailbox on the Internet, and a voice-mail service. Whether on the road, in a plane or at the office, success for the mobile professional depends in large part on the ability to easily and quickly access, sort through and respond to the messages delivered to each of these communication devices, and to obtain information necessary to the conduct of business from proliferating networks and services.

SUMMARY OF THE INVENTION

The present invention is a network system, which is based on internet, computing and telecommunications standards, utilizing computer and internet technology, an innovative graphical user interface, integrated communication applications and interactive voice recognition technology. The present invention is a unified messaging service which will be accessible from any standard communication device (telephone, computer or internet), and will give the user intuitive voice command of personal, professional and public information.

This unified messaging service is a useful tool to those whose time and resources are limited and for whom communication is critical, such as mobile business professionals in the small office, home office market. The mobile business professional must maintain access to personal and professional information and developments, respond to customers and communicate with colleagues, family and friends at any time and from any location. The unified messaging service is designed to meet these objectives by offering a single point of access to all communications, integrated with personal information management tools and customized public content delivery.

Small office, home office professionals, most of whom do not have access to dedicated information management systems or the benefit of administrative support staff, may derive unique value from this shared network solution.

BRIEF DESCRIPTION OF THE DRAWINGS

Preferred embodiments of the invention are explained below with references to the accompanying drawings in which.

DETAILED DESCRIPTION OF THE INVENTION

The present invention is a network system that works, among other things, as your voice-mail system, using an 800/888 number that receives all your calls, faxes, pages and e-mail. The system provides a contact database facilitating the placing of calls, screening of calls, and tracking you down wherever you are.

Regardless of how the message was transmitted, every message is delivered to you through a single source, whether telephone, internet or computer. You can also review your latest call records and billing information and change or add to your phone listings, contact numbers and service preferences through this source.

The present invention utilizes a fault resilient redundant system, residing in two separate sites. There are multiple T-3 (45 Mbps) facilities going into each of those sites. Both sites sit on a fiber-channel fiber optic loop, which is theoretically "self healing" in case of a disaster and can route a phone call to either facility, depending on where the route is broken.

Figure 1:
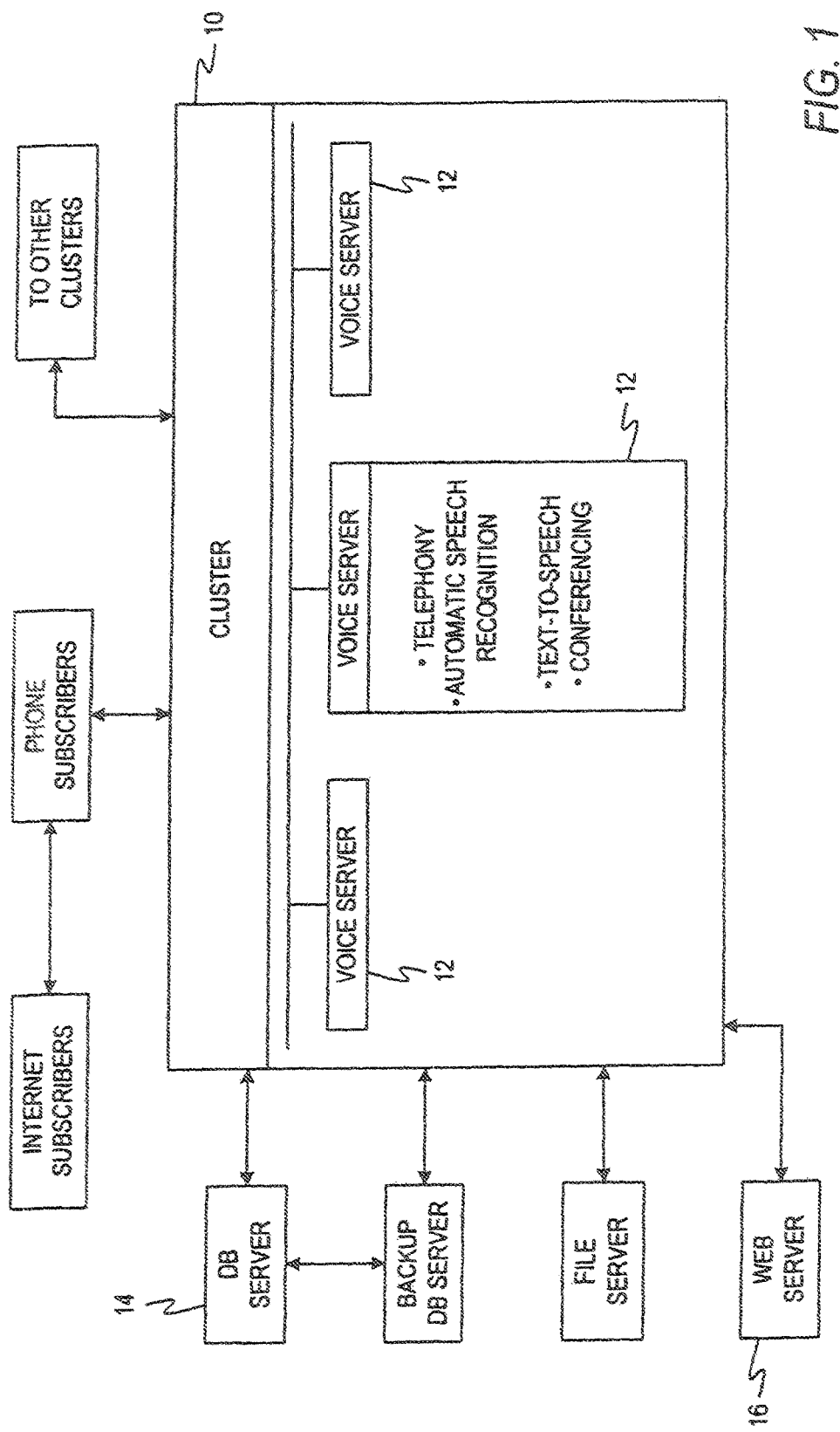
FIG. 1 is a functional block diagram of the hardware platform embodying the present invention.

The configuration at each site is a cluster of servers. FIG. 1 is a block diagram of the hardware platform showing one of these clusters 10 which consists of some voice servers 12, some mirrored Sybase database servers 14, and some web servers 16 where the web access and services are located. The computers (not shown) are 200 MHz Intel-based 19" rackmount servers running a combination of Solaris and SCO UNIX operating systems. The voice server 12 includes certain functions, such as telephony, automatic speech recognition, text-to-speech, conferencing, etc. Subscribers are connected to these clusters by either normal telephone connections or by internet connections.

Each cluster can serve about 10,000 customers. The system is open-ended allowing for the addition of subscribers as needed. Further the design facilitates the easy addition of hardware and software.

Figure 2:
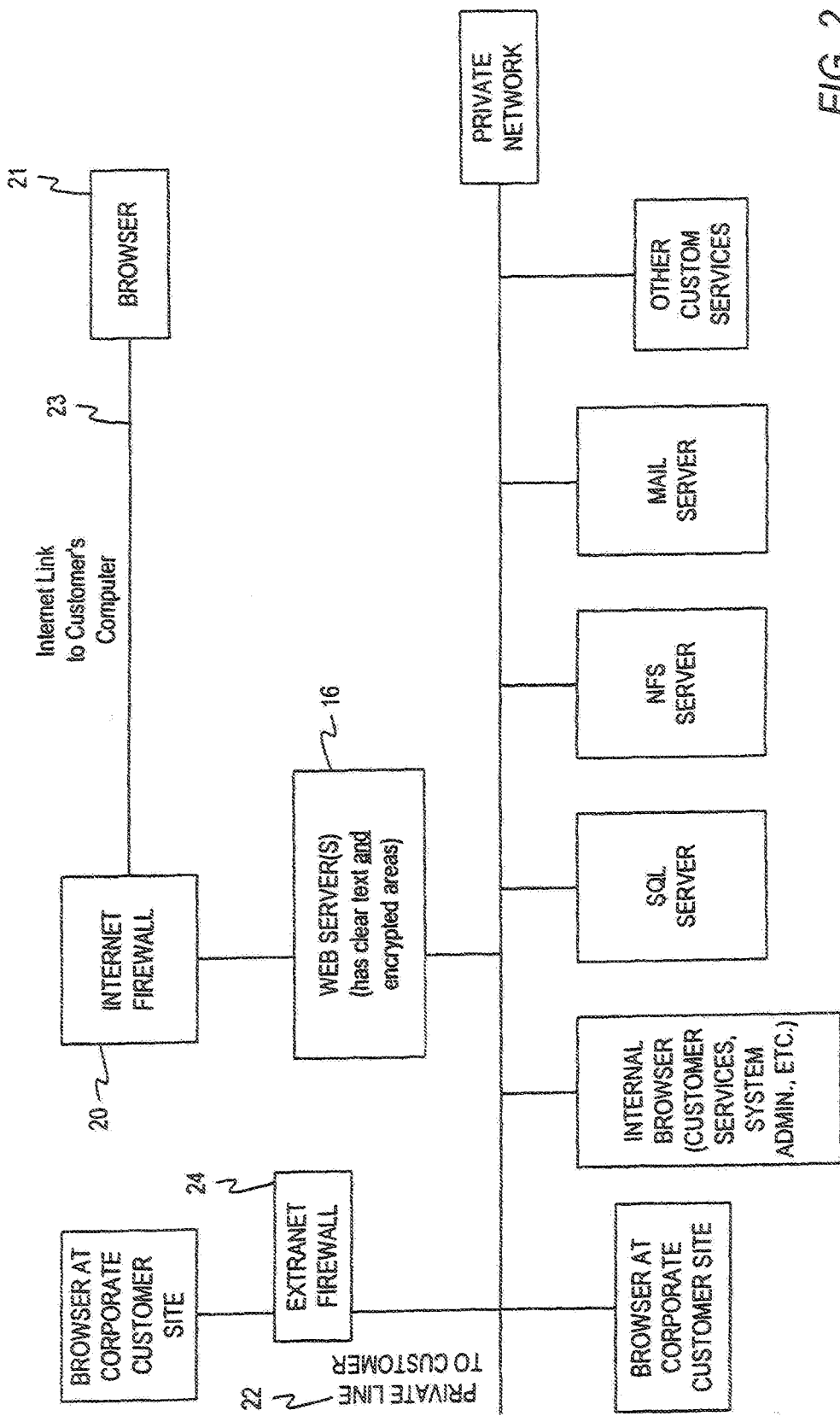
FIG. 2 is a functional block diagram of the internet platform embodying the present invention.

FIG. 2 shows a block diagram of the internet platform. The system may be accessed via the internet instead of a normal telephone connection (voice or touchtone). The subscriber can access the web server 18 through an internet firewall 20. The subscriber merely enters the system's web site and then can access his account through a security program. Once in his account, the subscriber can access various features such as playing voice mail, reading e-mail and faxes, managing contacts and schedules, among other services. Further, the system can provide a private line 22 for corporate and other subscribers which can enter the web server 18 through an extranet firewall 24.

Figure 3:
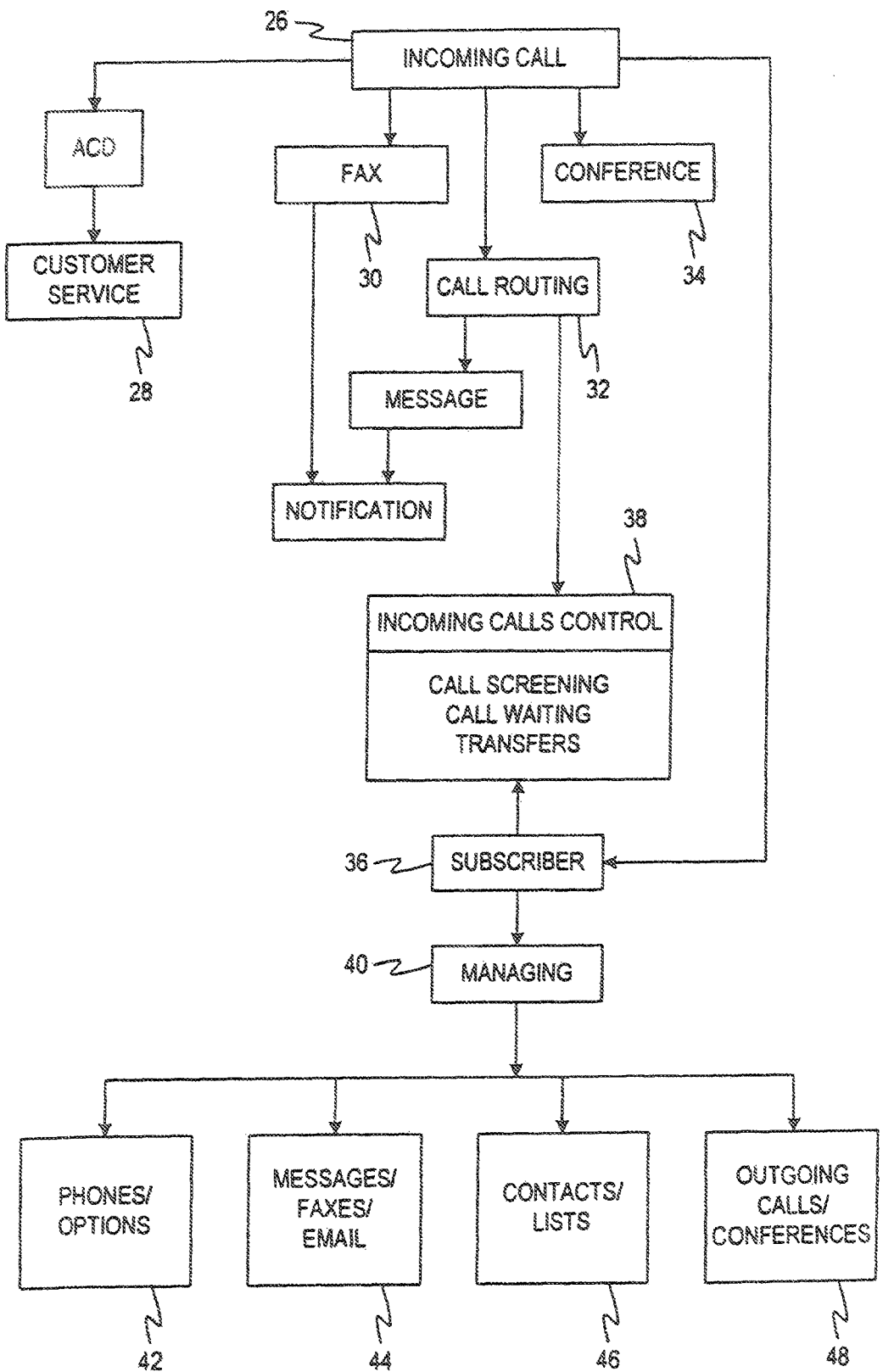
FIG. 3 is a general application flow chart embodying the present invention.

FIG. 3 shows a general application flow chart for an incoming call 26 to the system. The incoming call 26 whether by telephone connection or internet connection is directed either to customer service 28 (through an automatic call distribution-ACD), fax 30, call routing 32, or conference 34 function. Call routing 32 is determined by the incoming call control 38, previously set by the subscriber, and can include a message and notification to the subscriber, call screening, call waiting, and the transfer of the call. Further, if the incoming call 26 is a subscriber 36, the system will provide additional functions to the subscriber, such as controlling incoming calls 38, including call screening, call waiting and transferring calls. The subscriber may set priorities to certain callers allowing only certain callers to reach the subscriber while all others are sent to voice-mail to record a message for playback later.

Also, the subscriber will be able to manage 40 his account. Managing 40 includes setting the options for telephone calls 42, setting the options for sending and receiving messages, faxes and e-mail 44, managing the database containing the subscriber's contacts and other lists 46, and setting the parameters for outgoing call and setting up conferences 48.

Figure 4A:
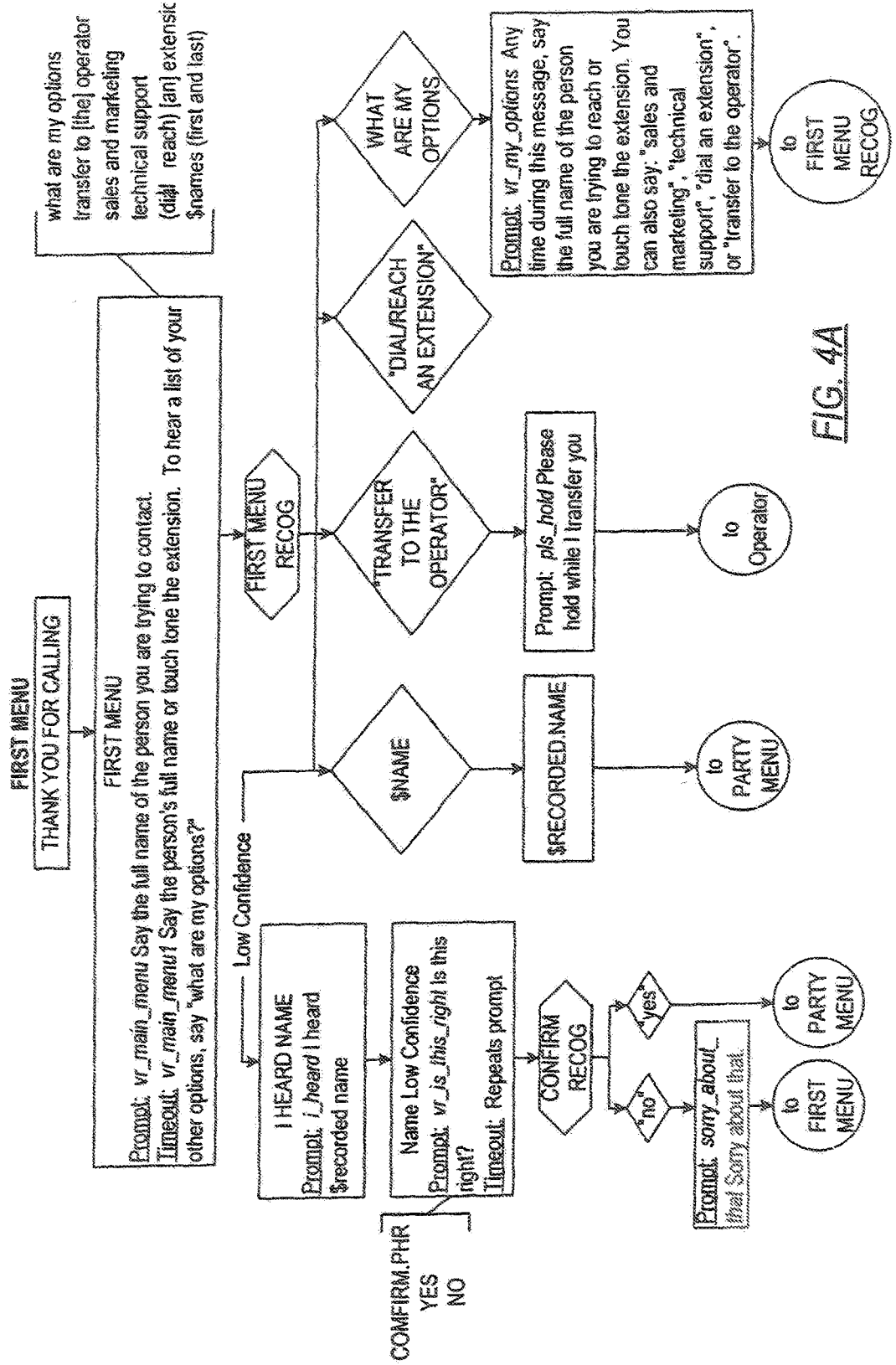
FIG. 4A-4R are detailed application flow charts embodying the present invention.
Figure 4B:
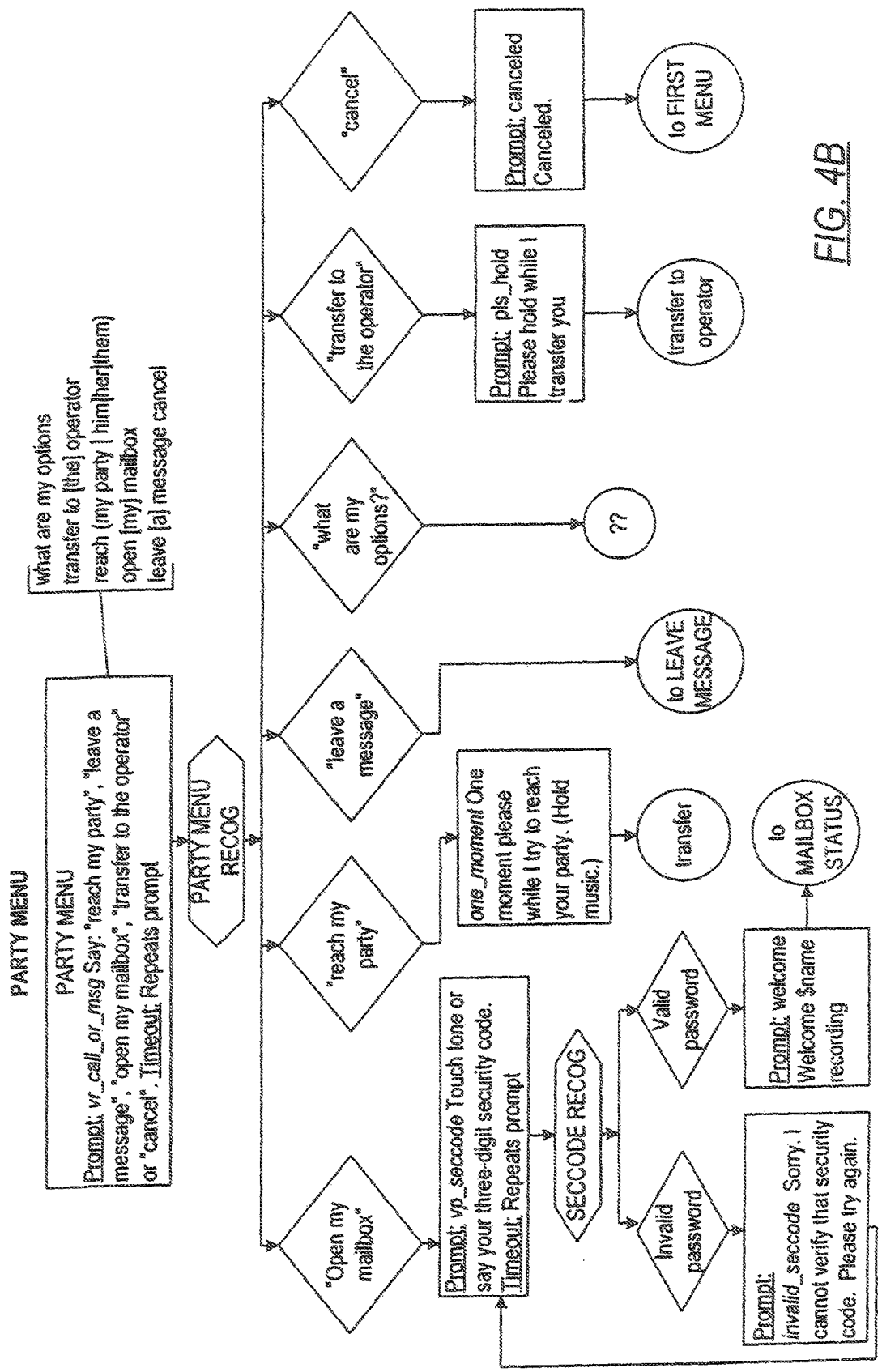
Figures 1, 4C:
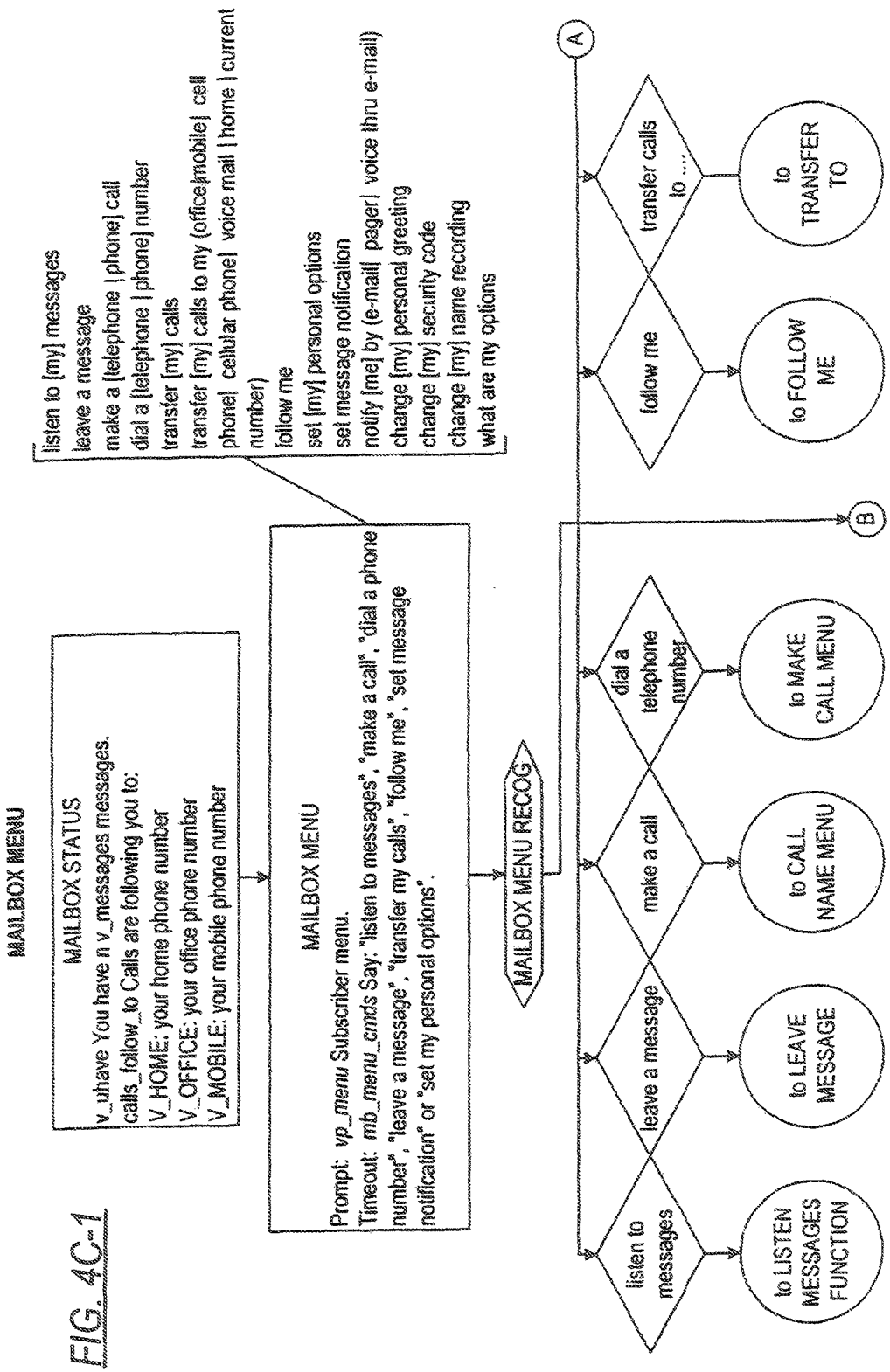
Figures 2, 4C:
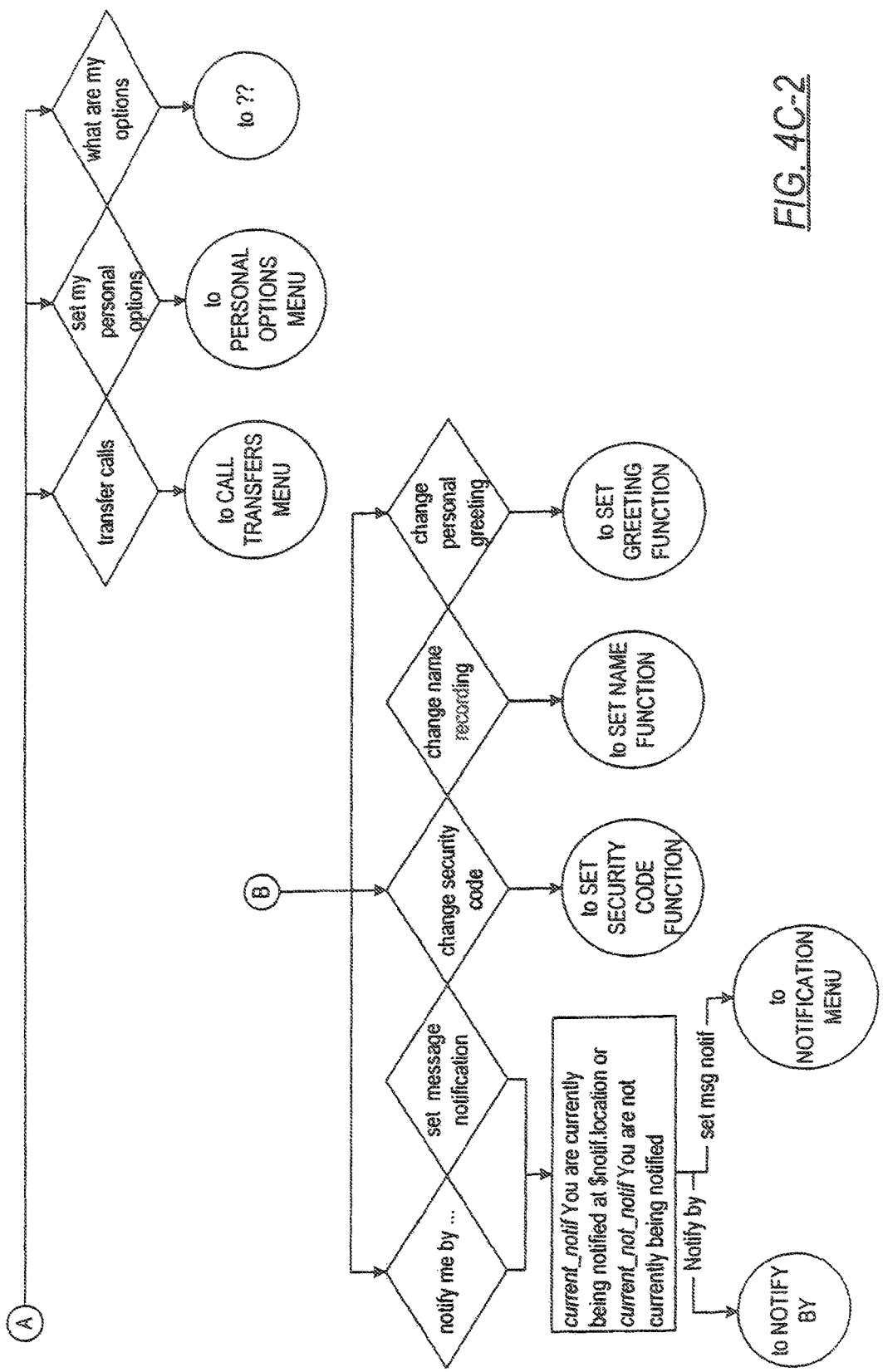
Figures 1, 4D:
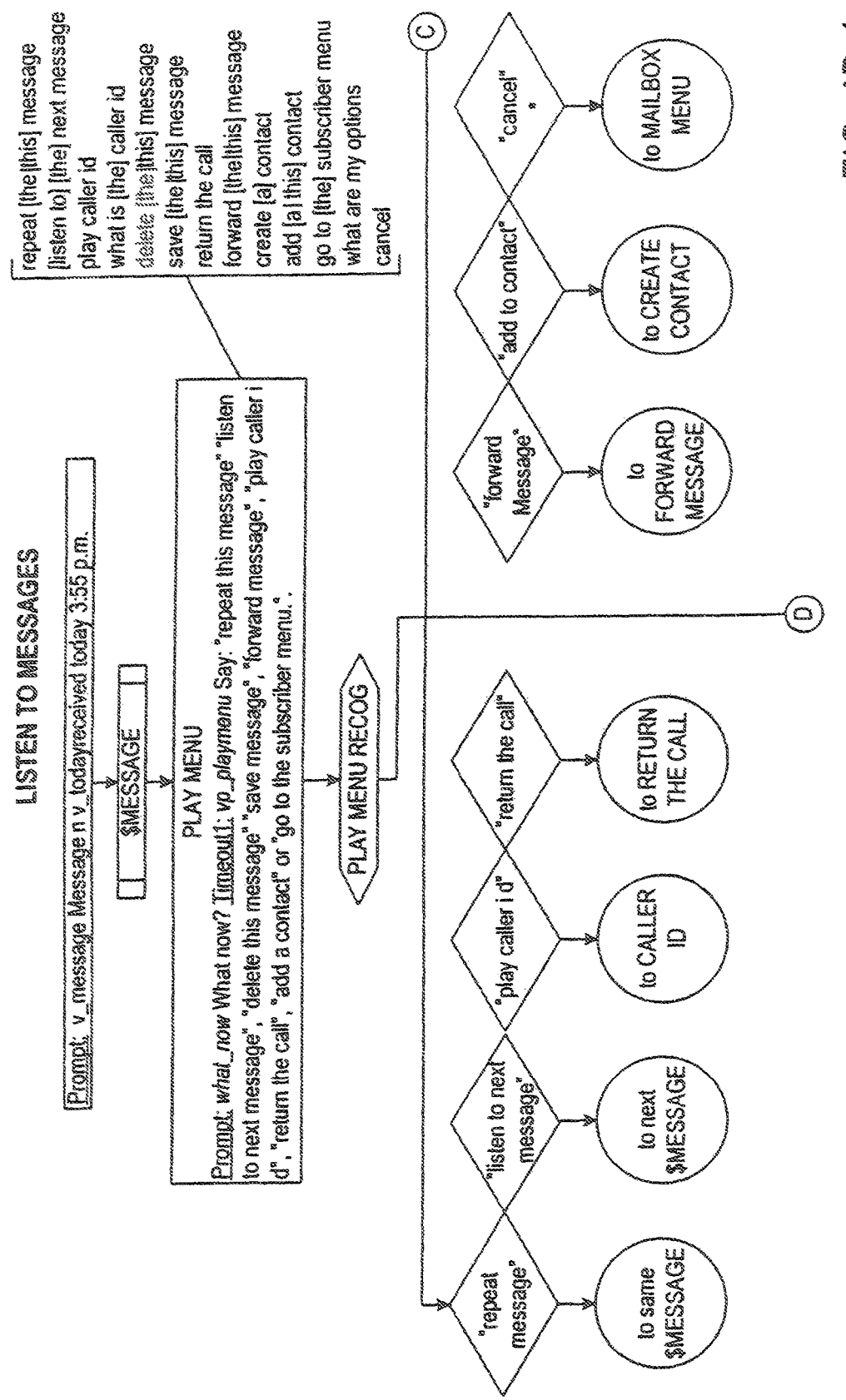
Figure 4D:
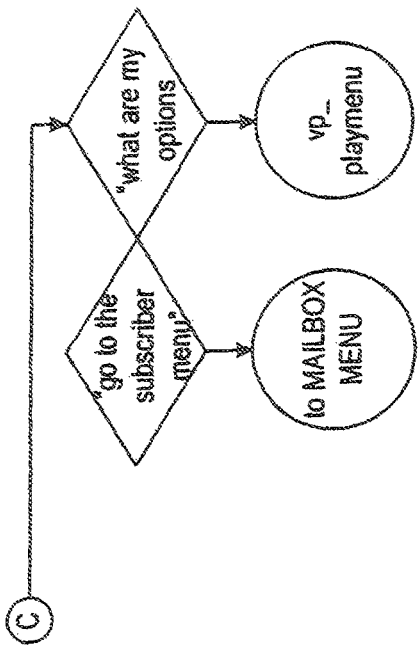
Figure 2:
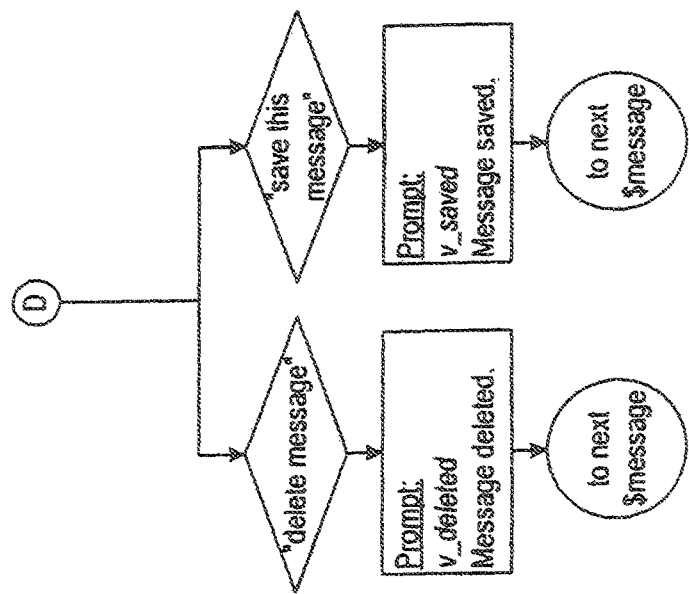
Figure 4E:
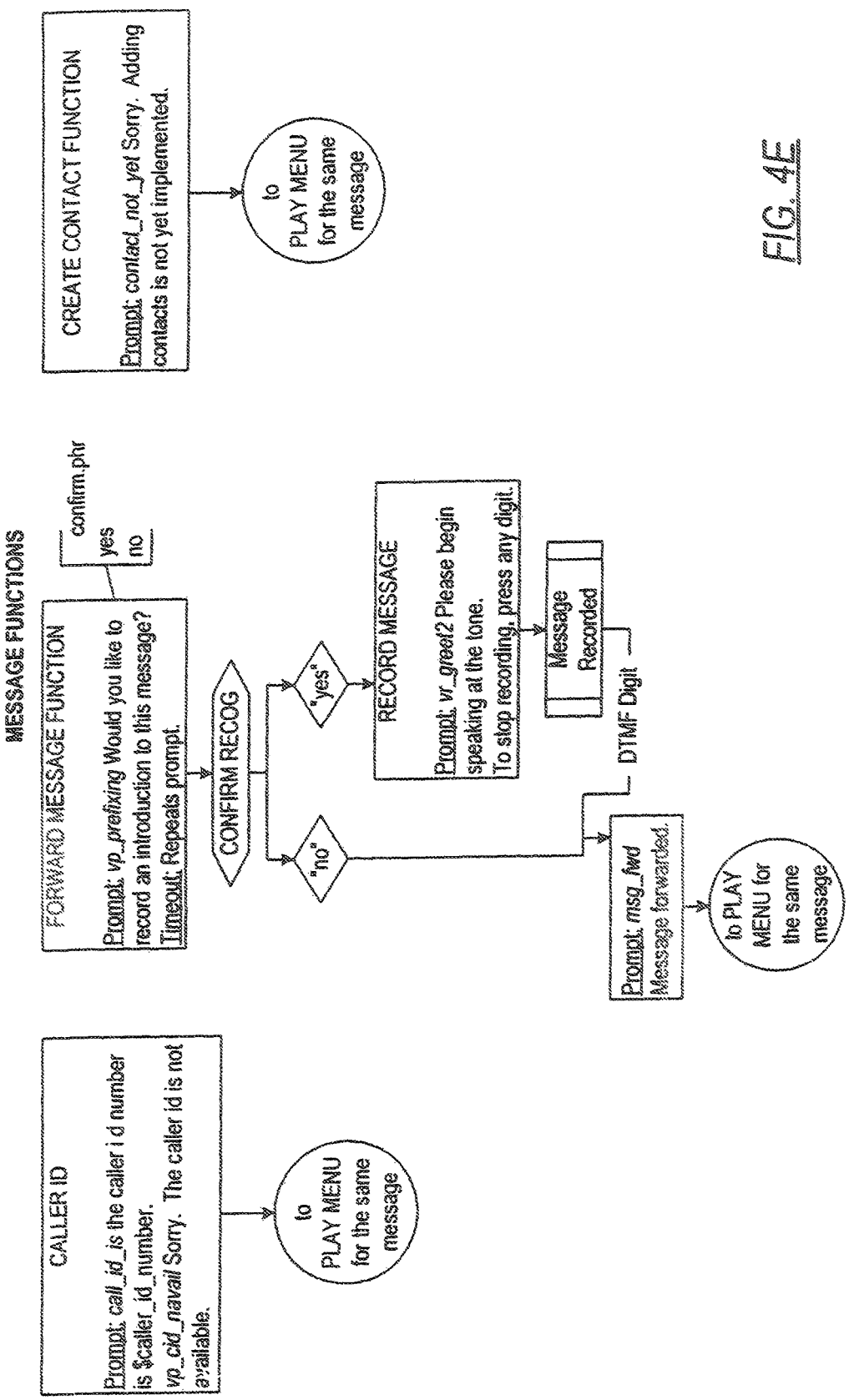
Figure 4F:
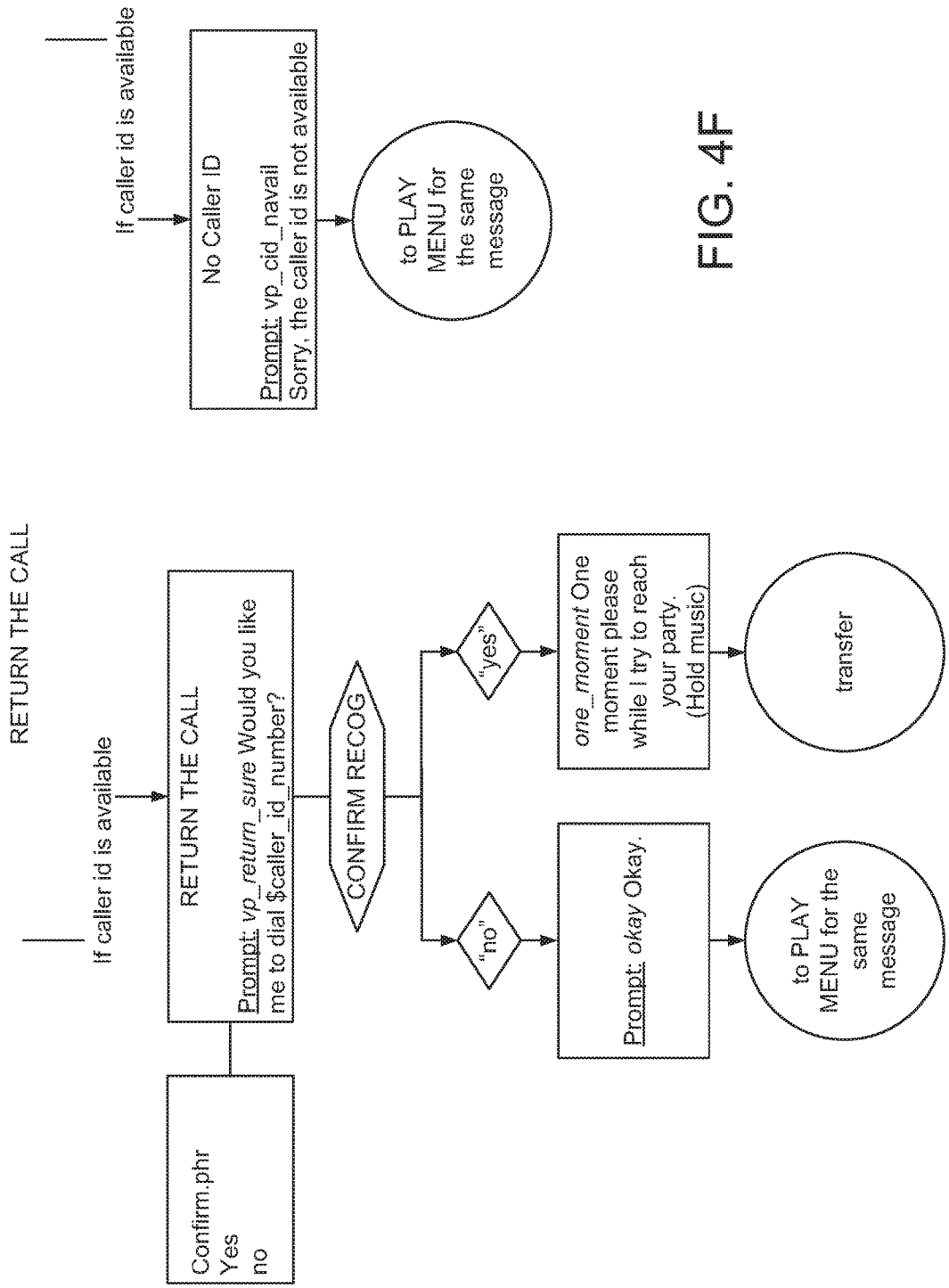
Figure 4G:
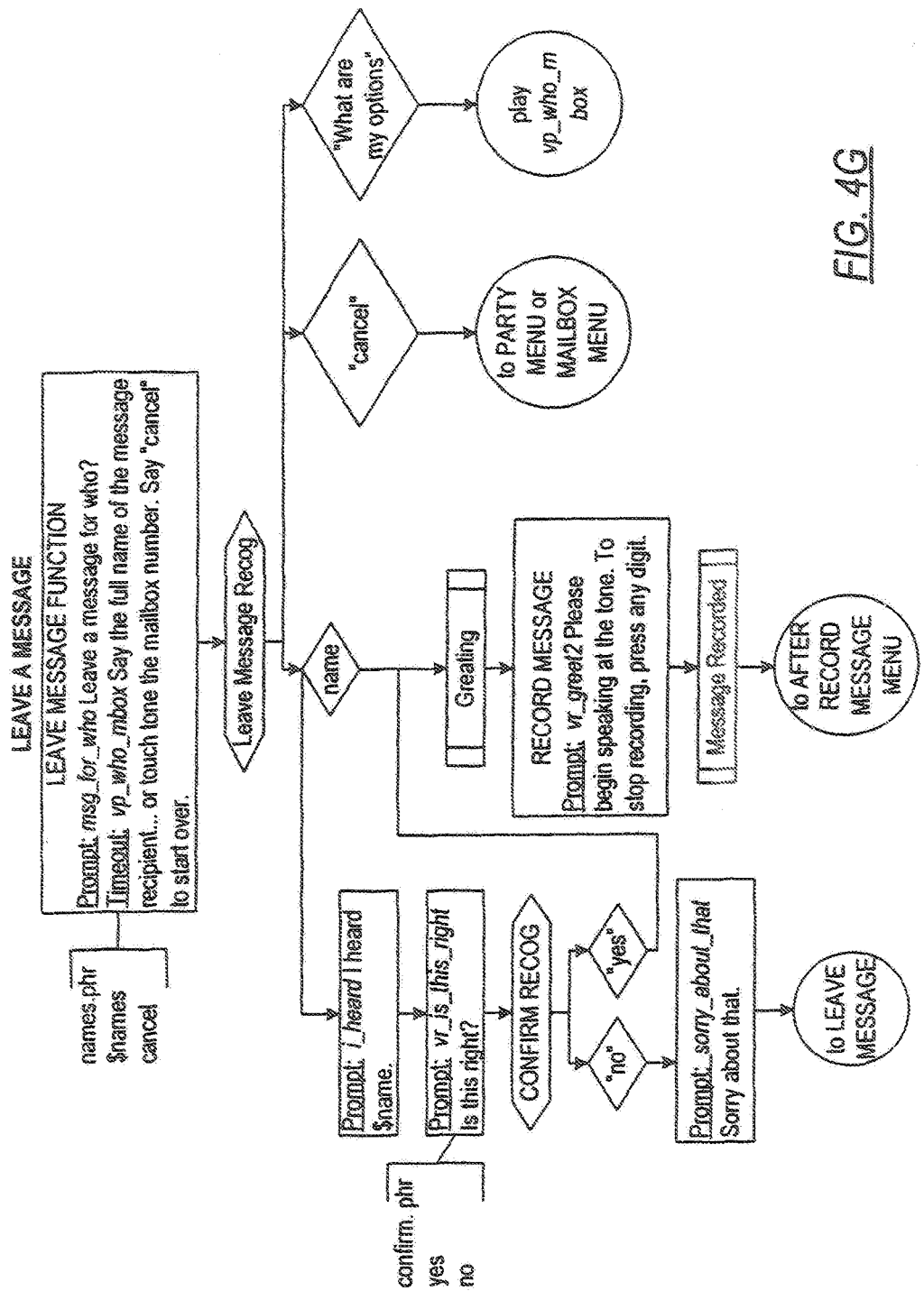
Figure 4H:
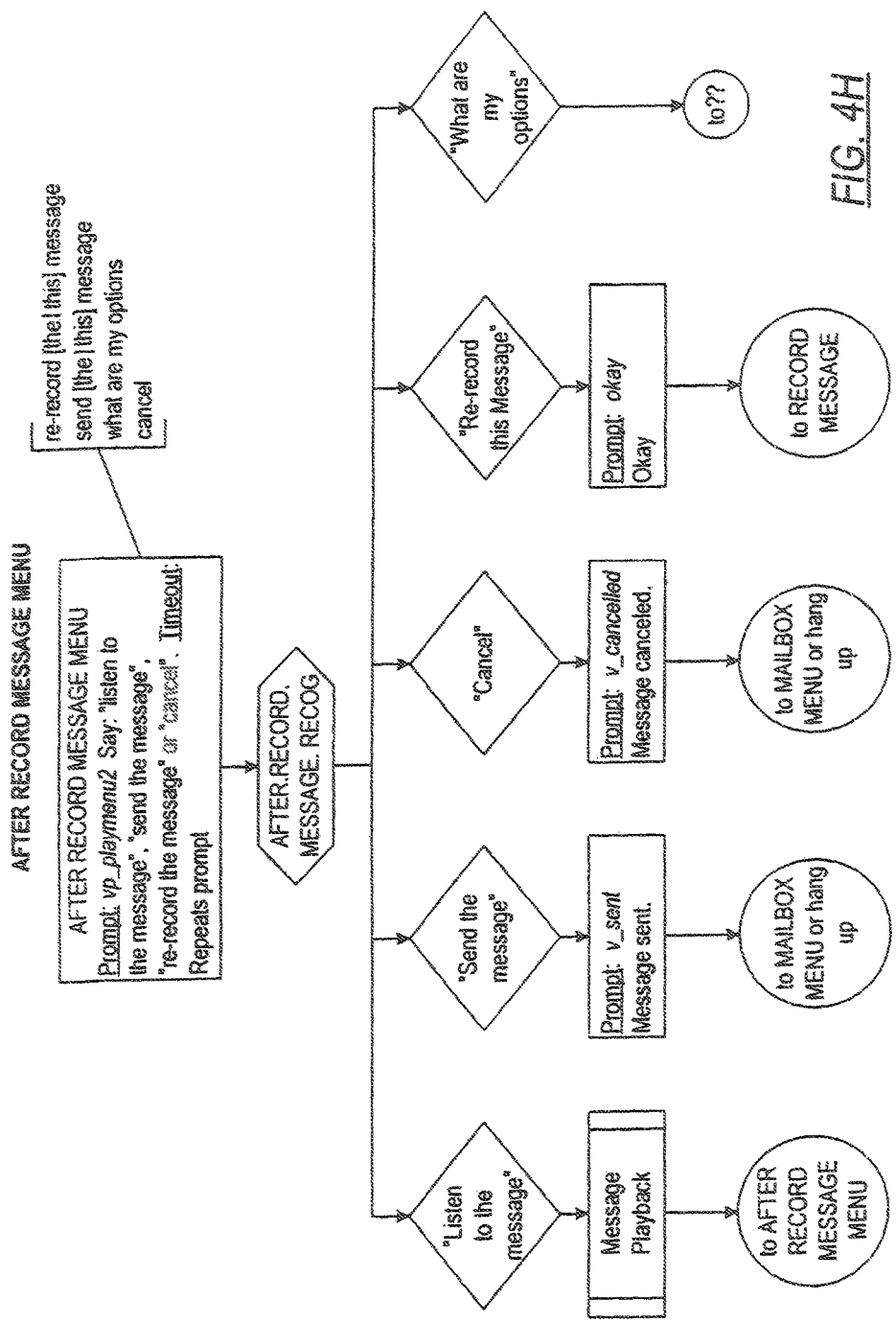
Figure 4I:
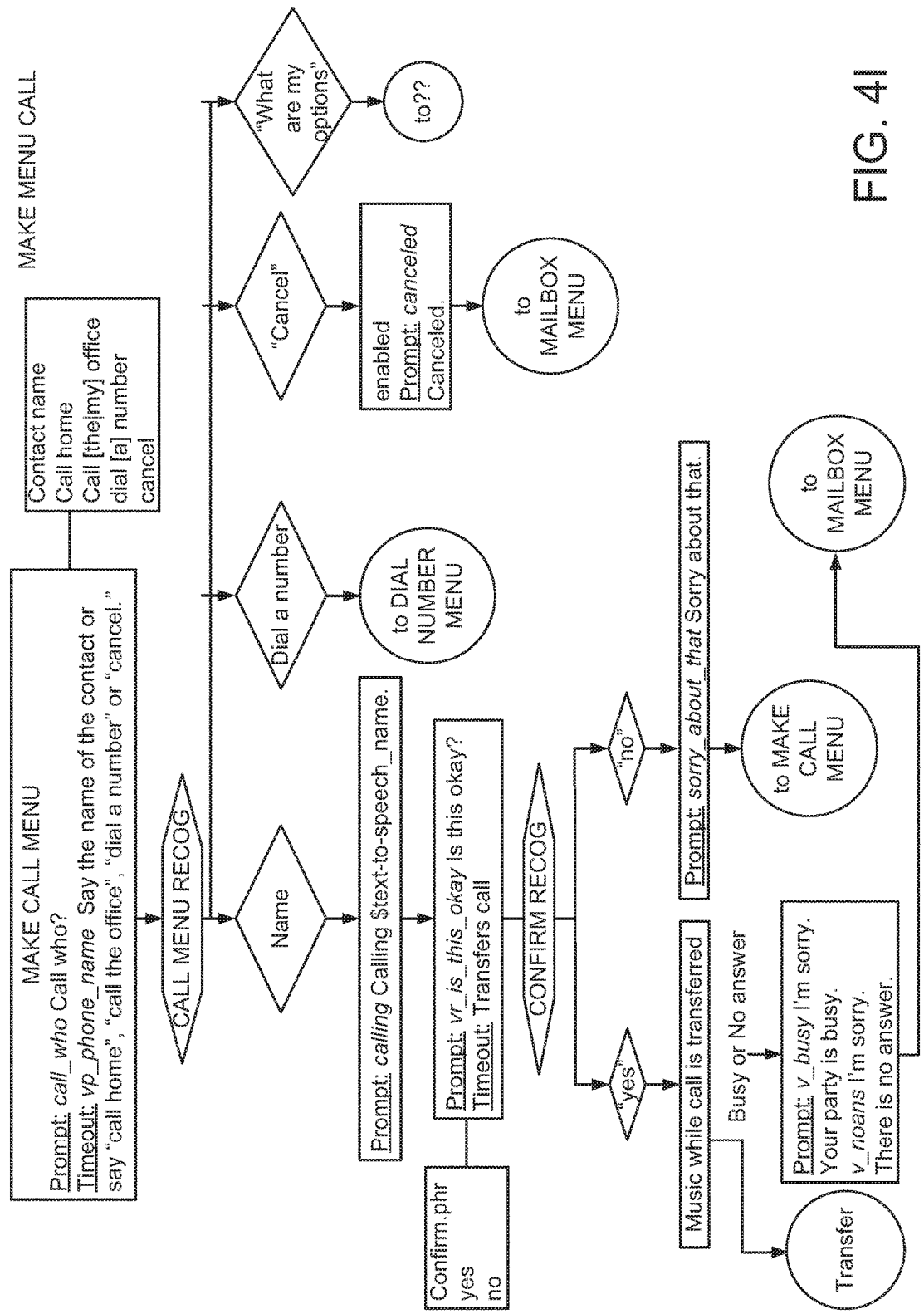
Figure 4J:
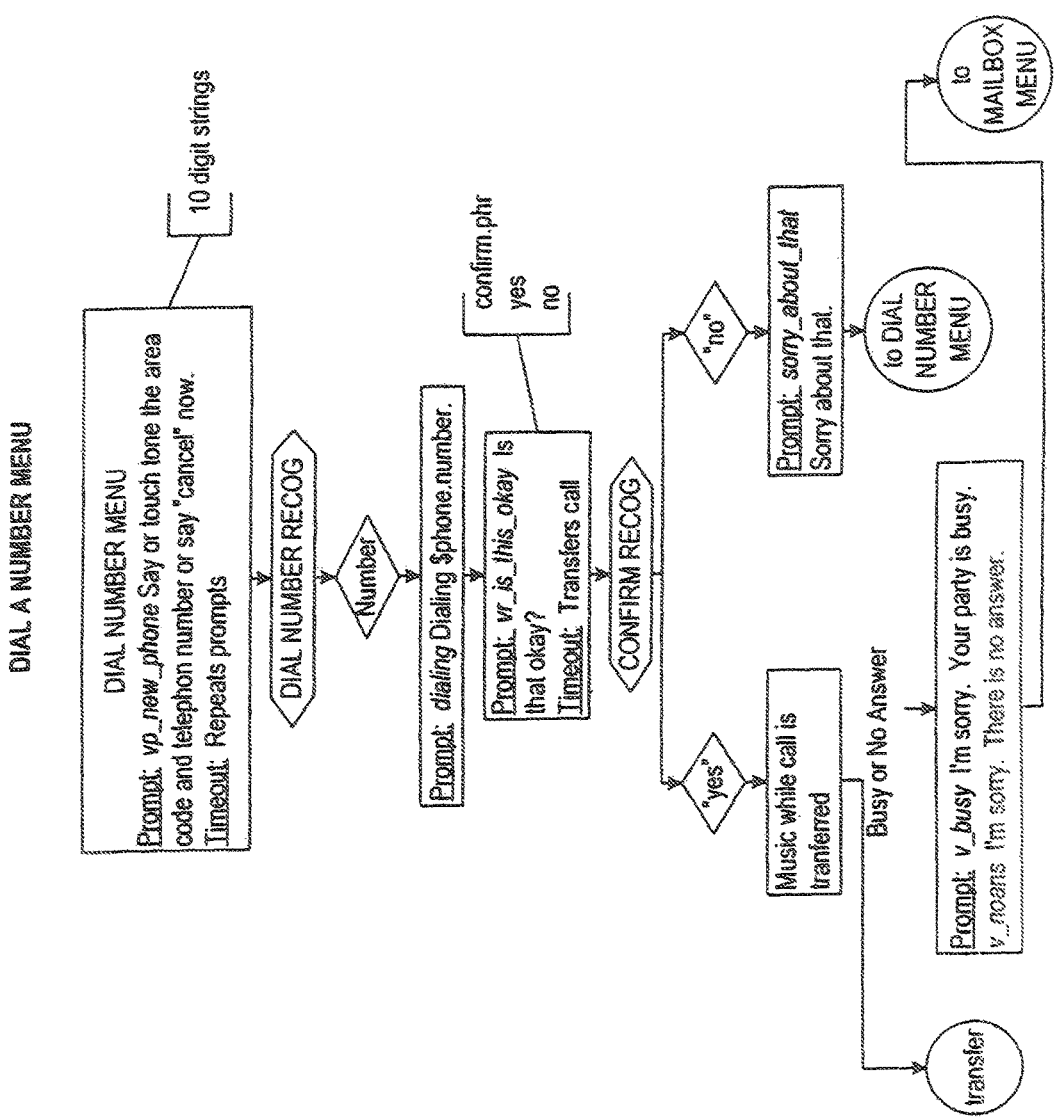
Figure 4K:
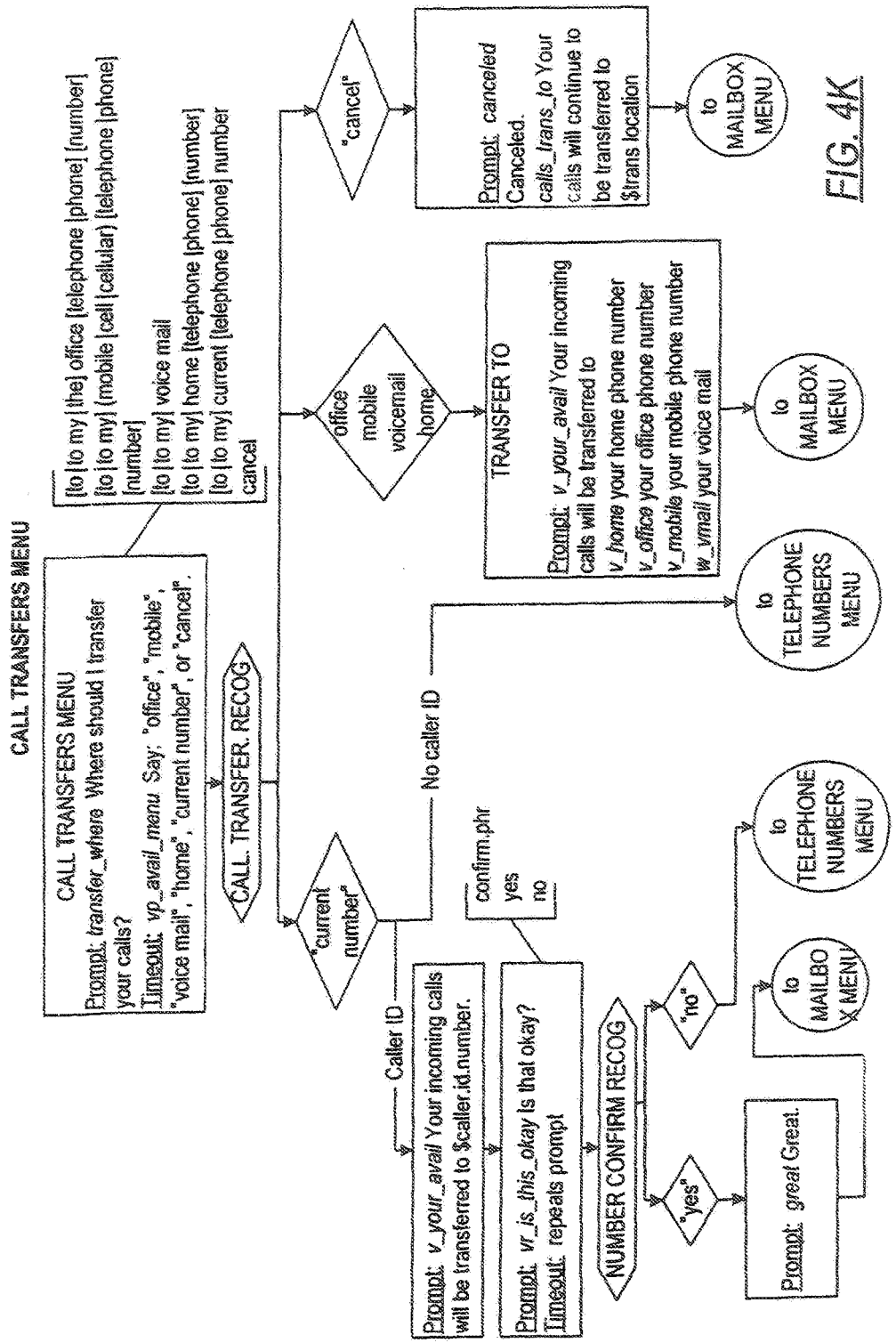
Figure 4L:
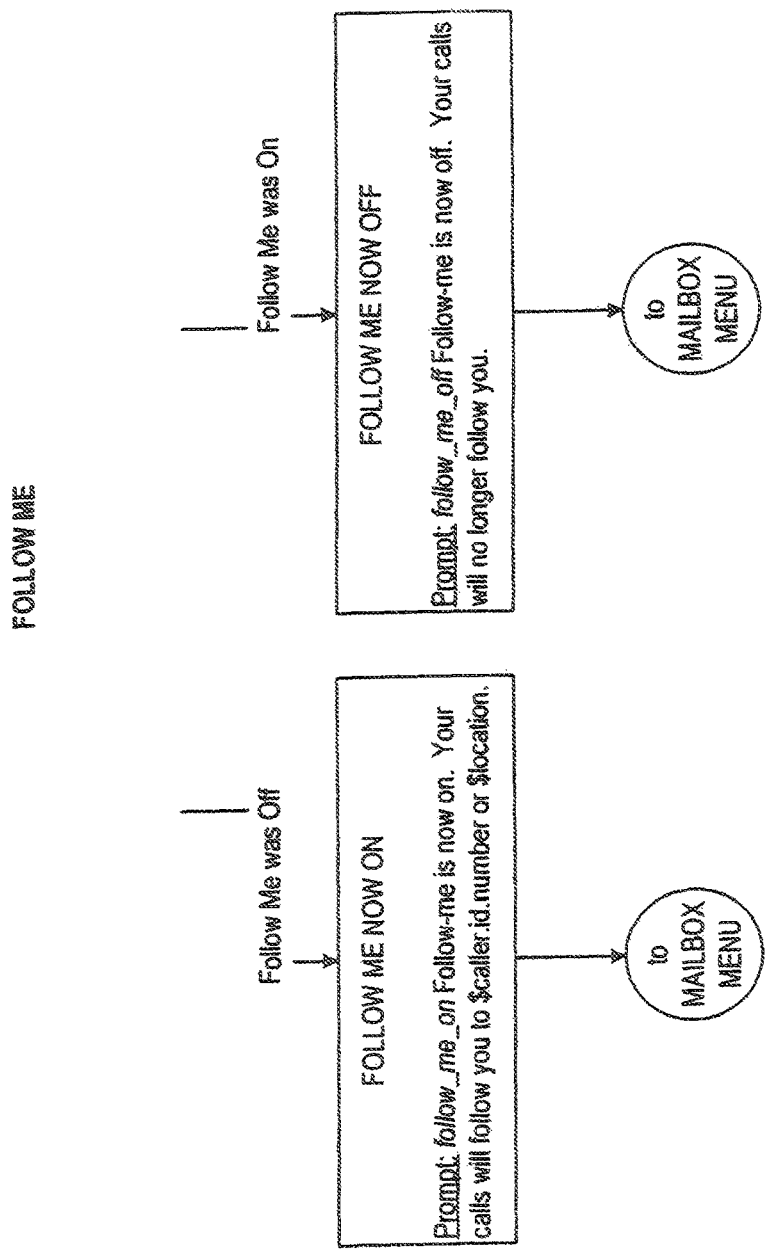
Figure 4M:
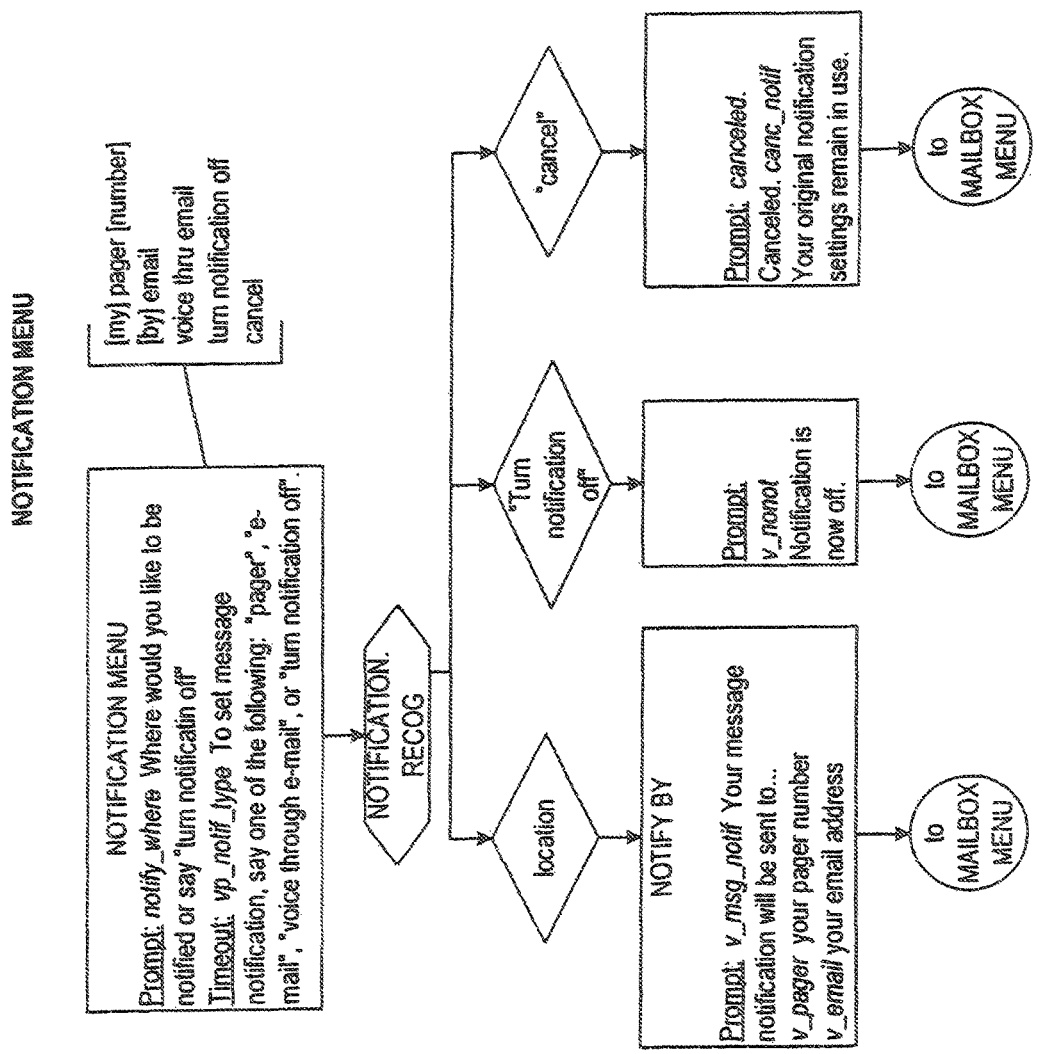
Figure 4N:
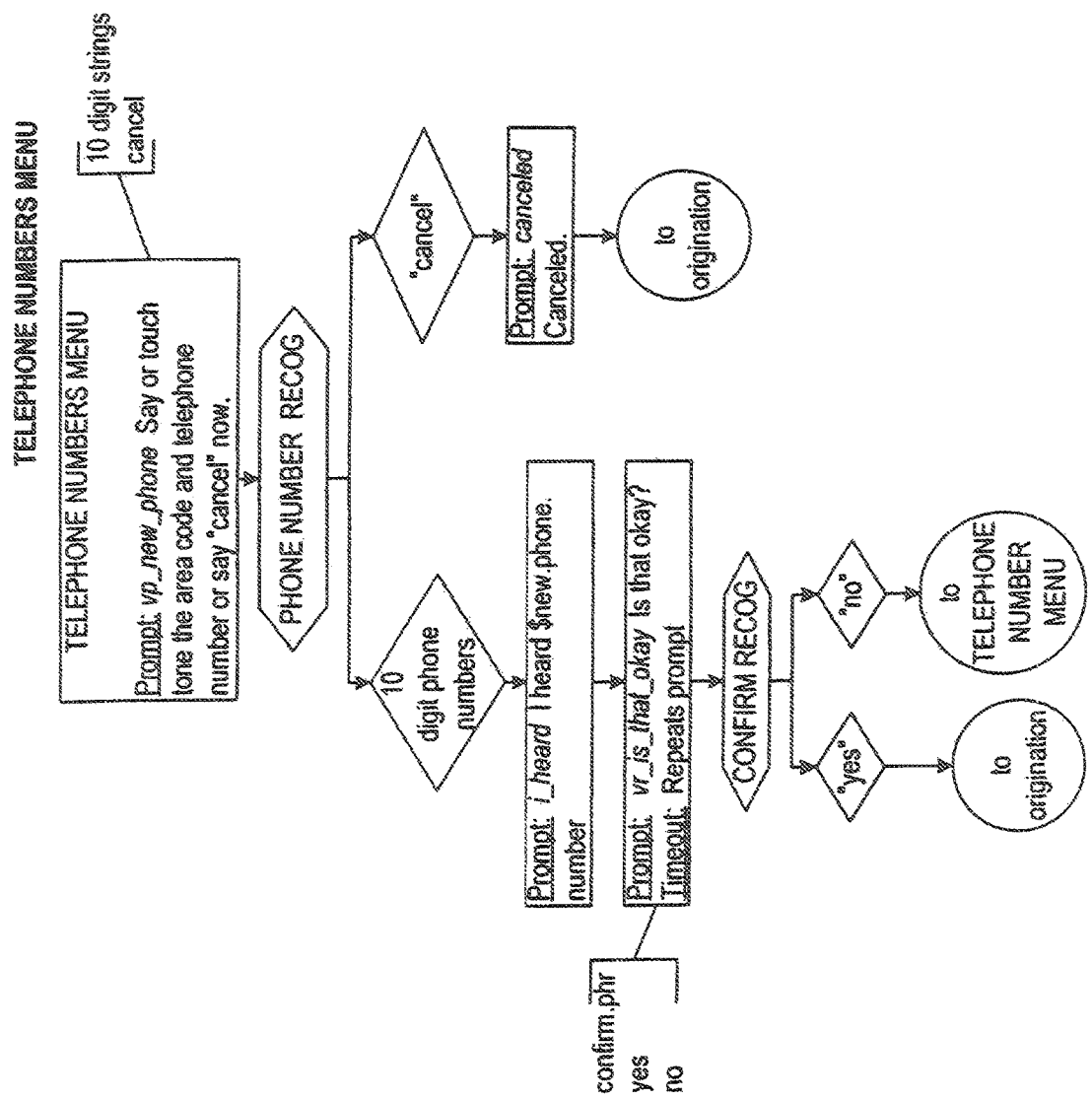
Figure 40:
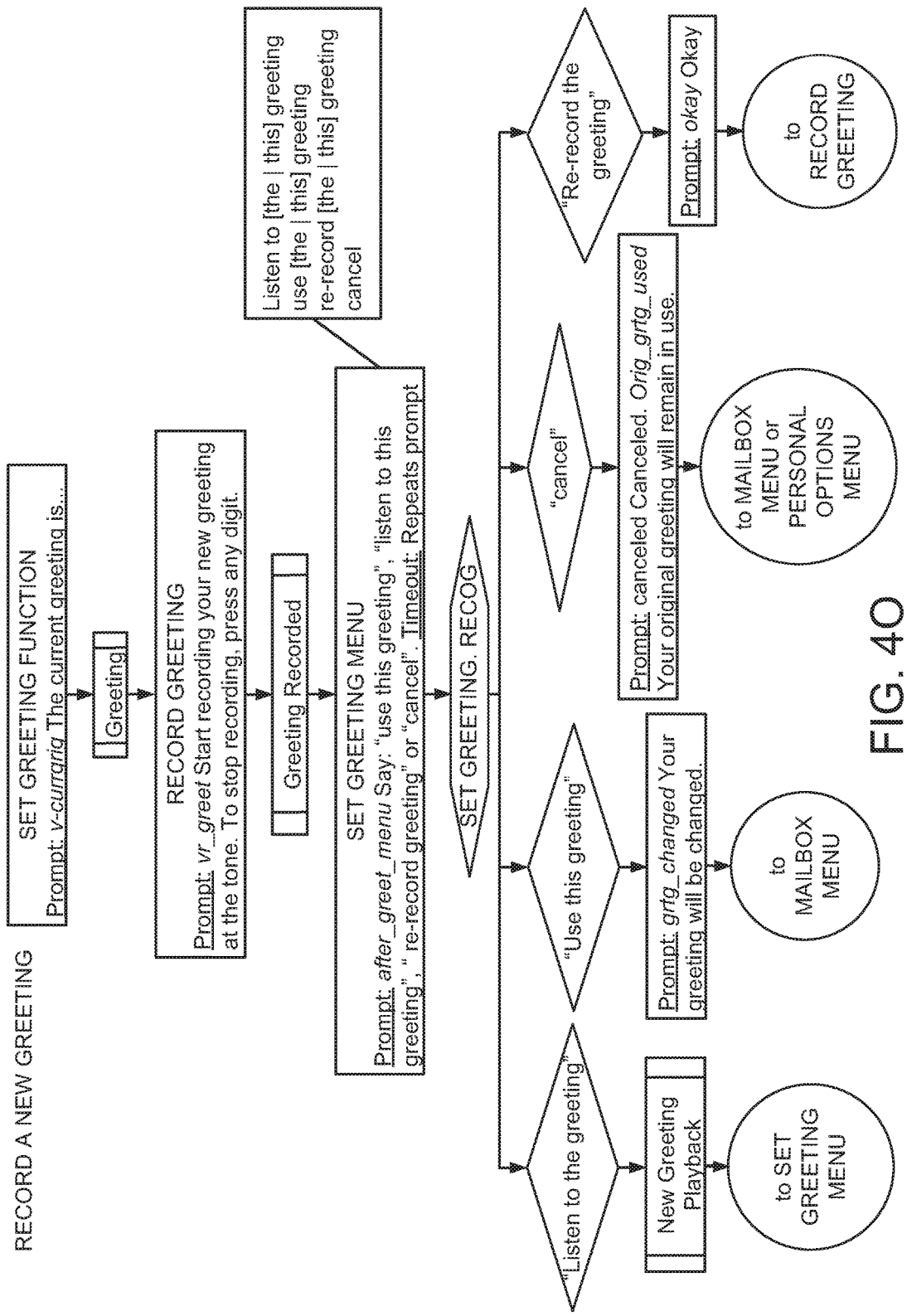
Figures 1, 4P:
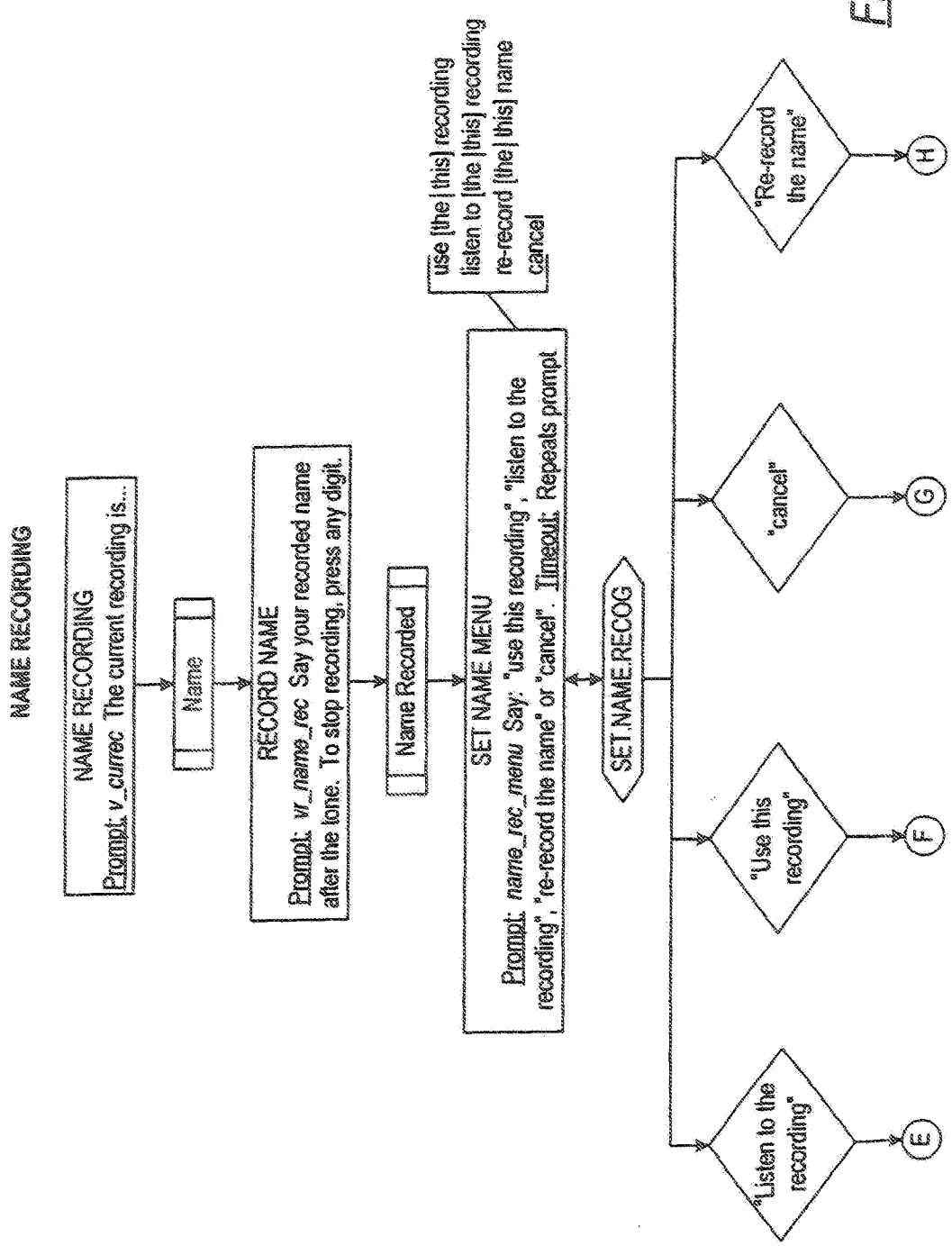
Figures 2, 4P:
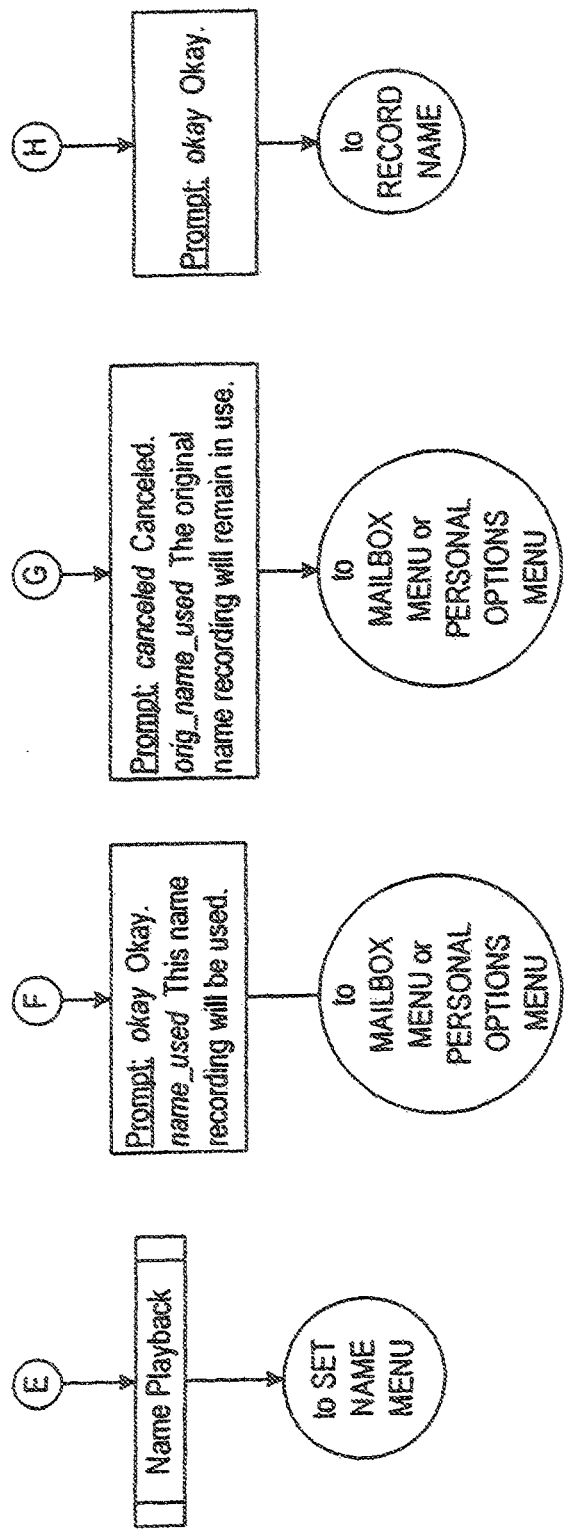
Figure 4Q:
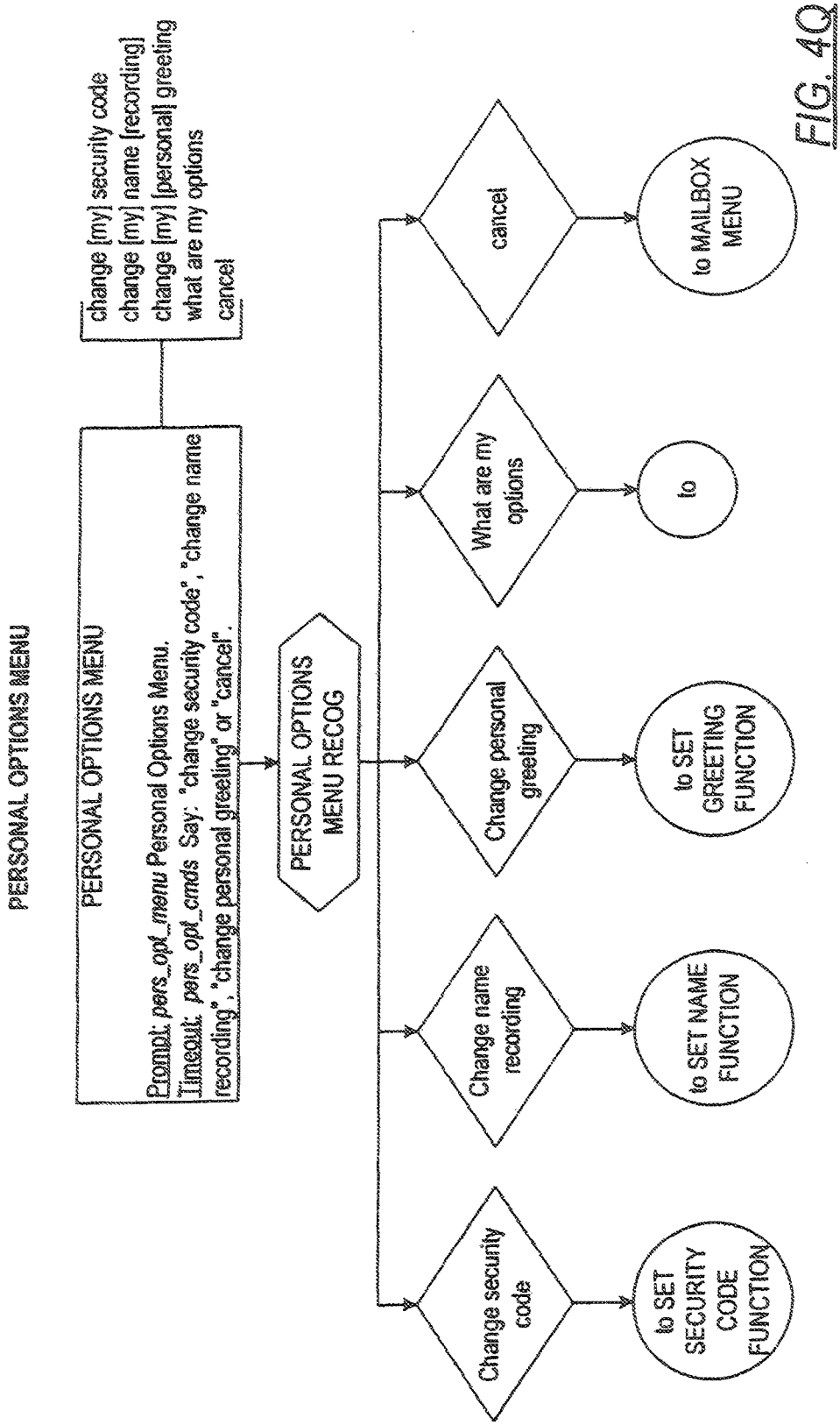
Figure 4R:
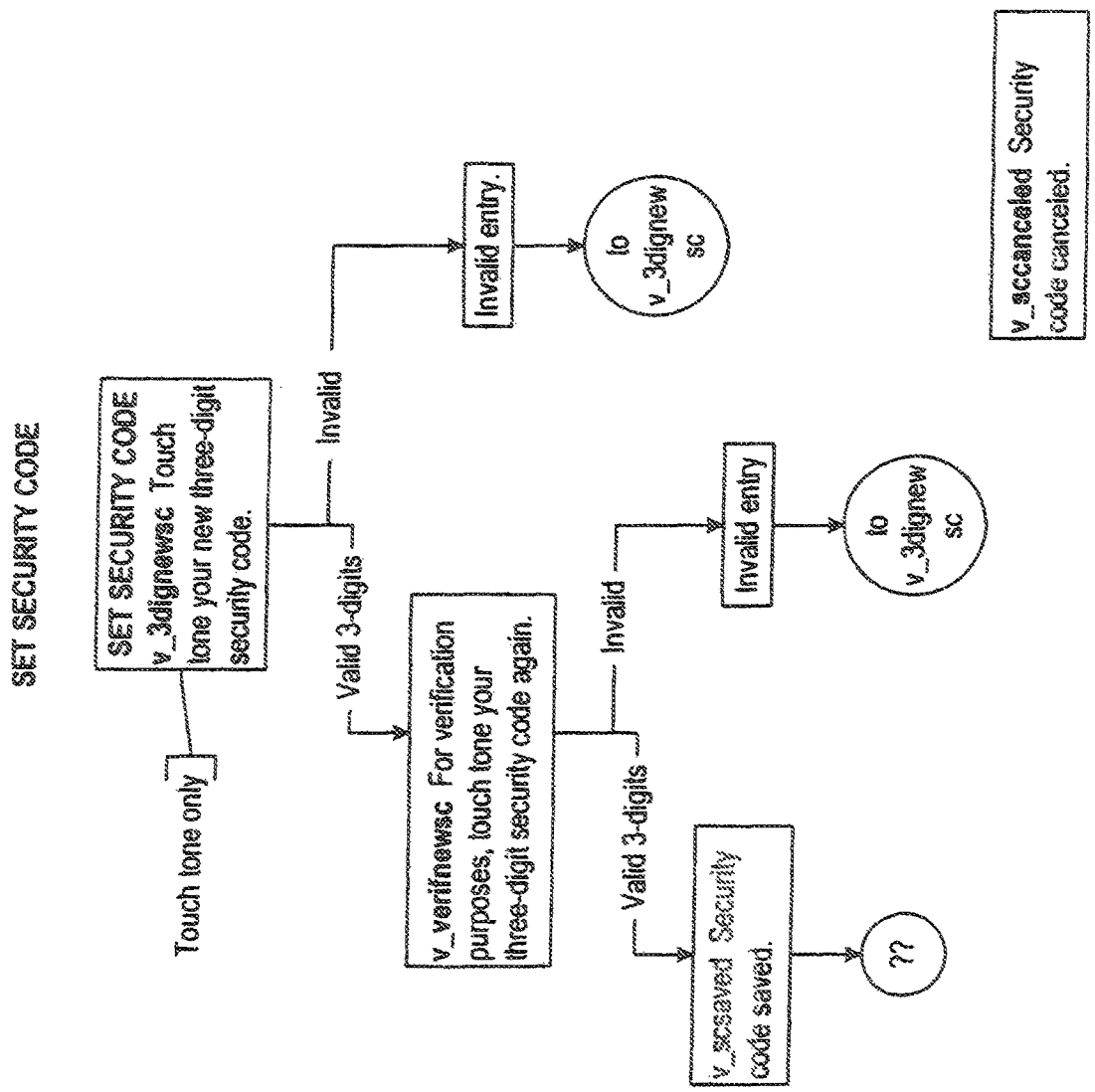

FIGS. 4A through 4R show a more detailed flowchart of the present invention. FIG. 4A shows the First Menu encountered by a subscriber or an individual calling the system's 800 telephone number. The caller is explained the different options and then the system, if requested, attempts to recognize the subscriber or party's name or extension that the caller is trying to reach.

FIG. 4B shows the Party Menu which allows the caller to begin the transfer to the party hr is trying to reach, leave a message, or, if the caller is a subscriber, open his mailbox. FIG. 4C shows the Mailbox Menu which allows the subscriber to listen to his messages, leave a message, make a call (using the database), dial a telephone number, request the system to follow the subscriber, transfer calls, and set other personal options, including the greeting, security codes, etc.

FIG. 4D shows the Listen to Messages Menu which allows the subscriber to listen to, forward, or return the message, along with other options such as adding a contact, etc. FIG. 4E shows the Message Menu such as forwarding the message, providing caller identification information, and updating the contact database.

FIG. 4F shows the Return a Call Menu which will attempt to use caller identification to return the call.

FIG. 4G shows the Leave a Message Menu which allows the caller to leave a message to the intended party. FIG. 4H shows the After Record Message Menu which allows the caller to listen to the message, re-record the message, send the message, or cancel the message. FIG. 4I shows the Make Call Menu which allows the subscriber to dial a number, cancel, or attempt to obtain a contact and transfer to that contact.

FIG. 4J shows the Dial a Number Menu which allows the subscriber to dial a telephone number. FIG. 4K is the Call Transfers Menu which allows the subscriber to transfer incoming calls to either his caller identification, a telephone number, or some other number of choice. FIG. 4L is the Follow Me Menu which allows the subscriber to receive calls wherever he may be located. FIG. 4M shows the Notification Menu which allows the subscriber to be notified either by pager or e-mail in certain situations. FIG. 4N shows the Telephone Numbers Menu which allows the subscriber to dial a telephone number either by depressing the telephone keypad or speaking the number.

FIG. 4O shows the Record a New Greeting Menu which allows the subscriber to record, listen, or re-record a greeting which a caller will hear upon reaching the subscriber. FIG. 4P shows the Name Recording Menu which allows the subscriber to set a particular name in the system. FIG. 4Q shows the Personal Options Menu which allows the subscriber to change the security code, the name recording, and the personal greeting. FIG. 4R shows the Set Security Code Menu which allows the subscriber to set a new security code.

Figure 5A:
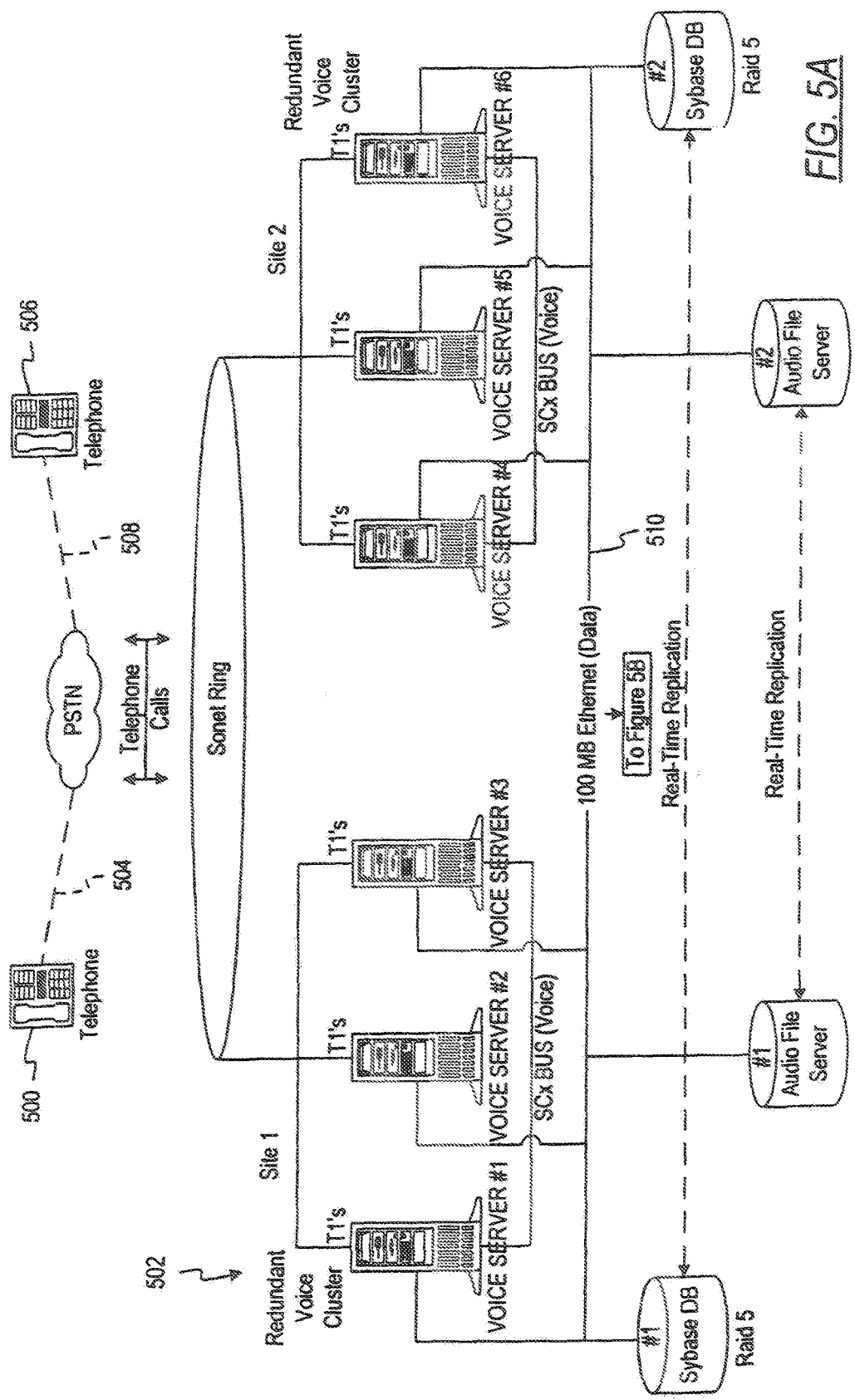
FIG. 5A-5B are the functional block diagrams for the computer telephony platform and network architecture embodying the present invention.
Figure 5B:
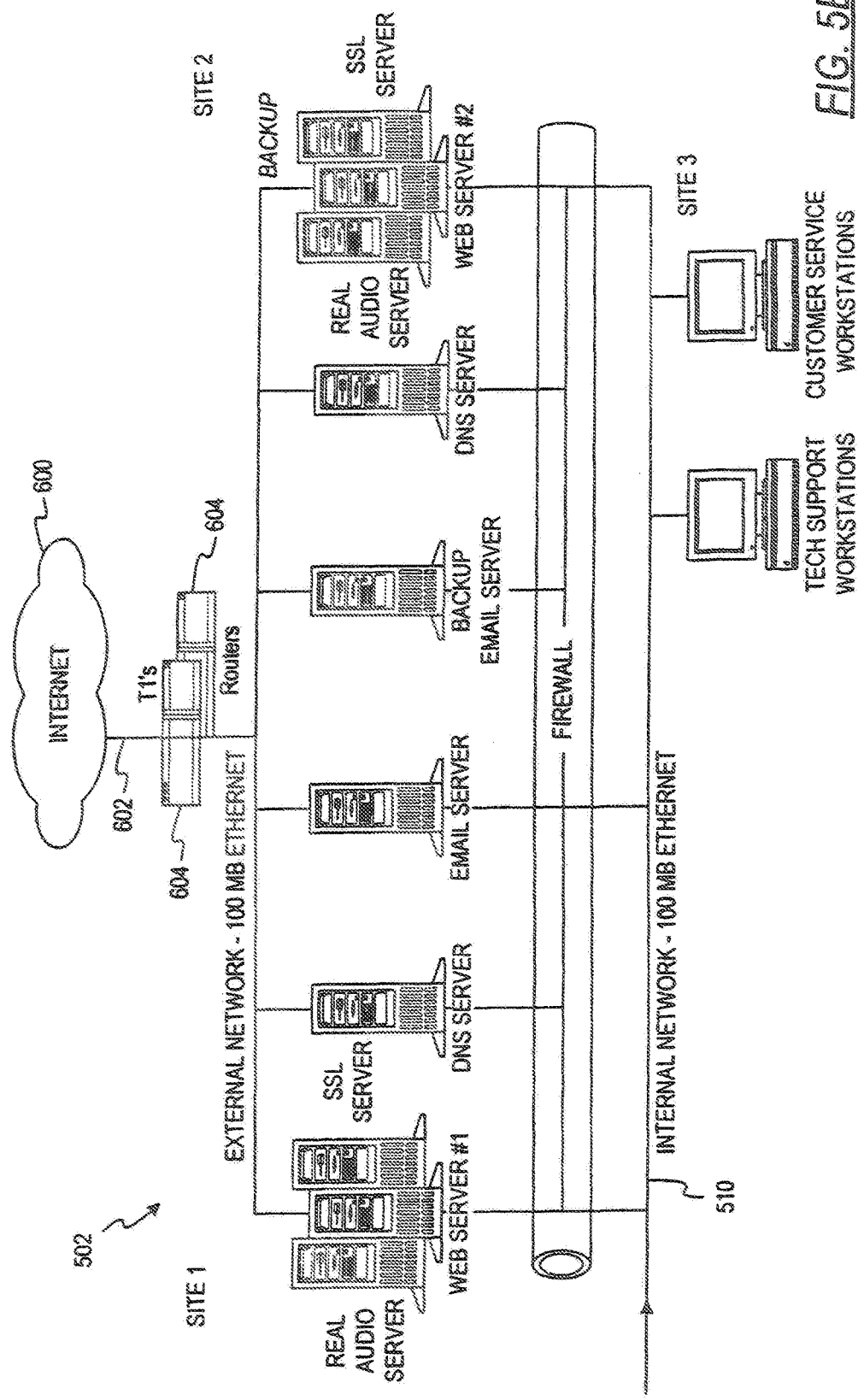
Figure 6:
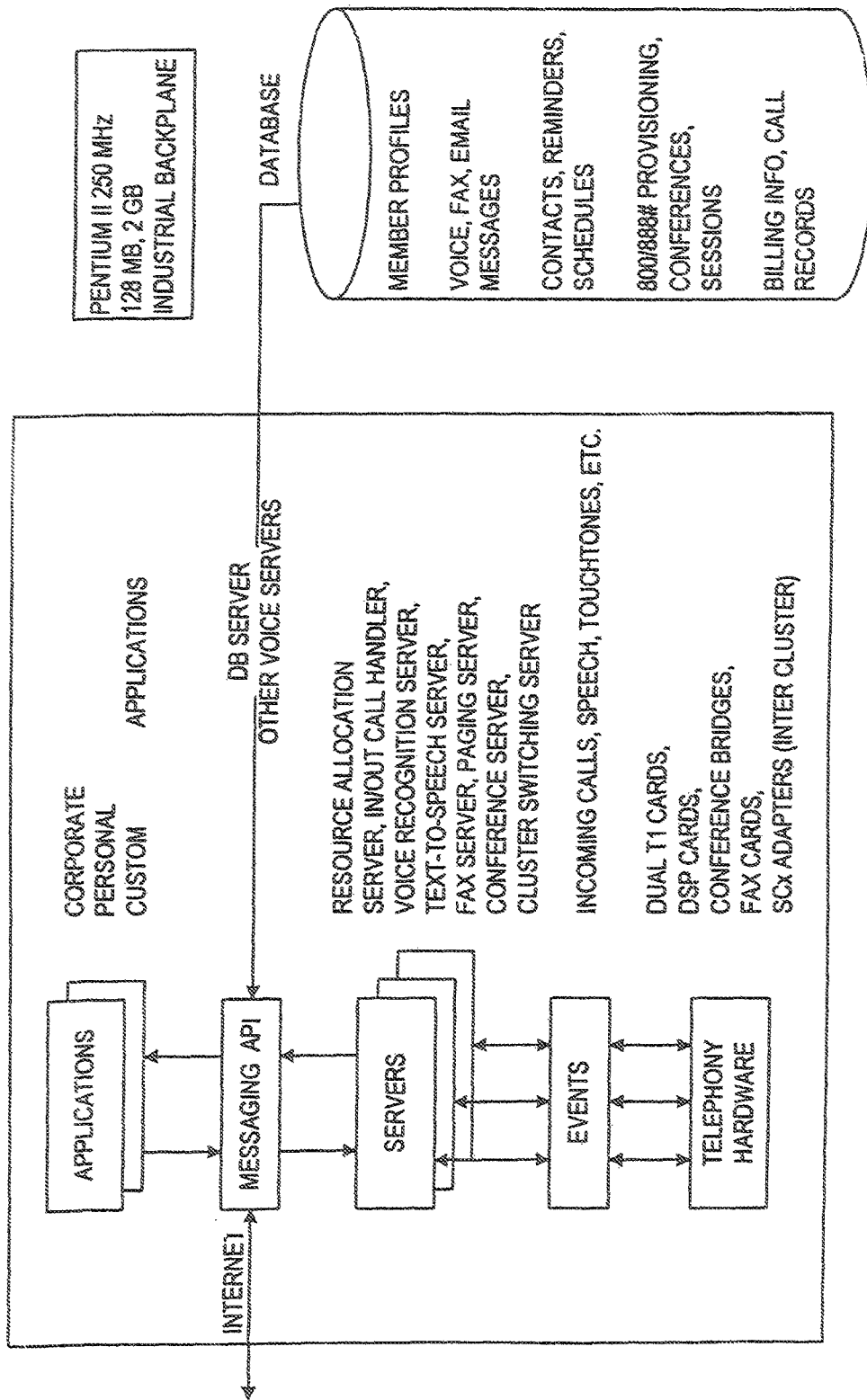
FIG. 6 is the software architecture embodying the present invention.

FIG. 5A shows the computer telephony platform in accordance with FIG. 1 in more detail. FIG. 5B shows the network architecture in accordance with FIG. 2 in more detail. FIG. 6 shows the software architecture utilized in the present invention.

The system provides three ways for the subscriber to handle his communications. First and foremost is the voice recognition software using natural voice recognition (phonemes based), not pattern based as many of the current systems utilize. Therefore, the system does not have to be trained to identify your voice. Second, the subscriber may use the standard telephone touchtones. And third, the subscriber can utilize the internet to access a secure web site.

The system can act as a "follow me" service, capable of tracking you down whether you're at home, the office, airport, in a hotel room, in another office or in your car. The subscriber can configure the system to follow him, or the subscriber can disengage the follow me with a simple command. It also lets you know who is calling before you accept the call.

As for Web connections, you can boot up your computer, sign onto the internet, go through the system's secure web site and play your voice mails, read your e-mail and faxes, manage your contacts and schedule conferences. The website thus becomes a unified-messaging system. If you get a message from somebody who's not in your address book and you want to call him or her, you just go to the web site again and add a contact.

If you're on the secure website and you walk away, the system even times out after a few minutes so no one can sit at your computer and obtain your messages and contacts without your permission.

While on the system's web site, you'll be communicating over the internet via the Secure Socket Layer (SSL), a transport level technology (developed by Netscape) for authentication and data encryption between a Web server and a Web browser. SSL sends data over a "socket," a secure channel at the connection layer existing in most TCP/IP applications.

The system also utilizes text-to-speech so you can listen to your e-mail over the phone, or the subscriber can display his e-mail on his computer where he can reply to it and send e-mail to his contacts with audio (using audio attachments). Further, using Vosaic's internet audio program, the system can deliver voice mail via streaming audio over the internet using Java without a plug-in.

During a session on the web site, using text-to-speech, you could type in a name like "Harry Newton" and his phone number so that, when you eventually use the system the phone and you say, "call Harry Newton at the office," the system will recognize the name and dial the number you keyed in previously. Based on what you input now ("Harry Newton") is what the system utters later and compares the phonemes of what you input now to what you'll be speaking later.

The system also facilitates conference calls by allowing the subscriber two ways in which to set up a conference call. First, inbound conference calls can be set up for 32 people if you've registered a pre-scheduled meeting time. Subscribers call in to the system to get an assigned conference number. The conference participants then call in and asks to "join the conference". The system then asks for a conference number, which is entered via touchtones. All the parties are then connected and the conference begins.

Second, outbound conference calls can also be set up, even if you're "on the fly." Whether you're at your desk, at a hotel or even a phone booth, you can simply dial up and tell the system to "set up a conference call." Then you only have to dial up all the various parties to connect each of them to your conference.

The present invention is a compilation of hardware and software, including voice processing using Dialogic's SCSA extended bus and board-level resources, Purespeech speech recognition running on Dialogic Antares boards, and database management using Sybase System 10 and 11. Further, the system utilizes data networking, particularly TCP/IP and distributed systems, object-oriented design and programming, multi-processing with Intel hardware, SCO UNIX and Solaris operation systems, Java and JavaScript languages, US and international long distance protocols, internet and web protocols, credit and payment processing, a help desk, customer service system, and network and service management.

For the voice and fax processing servers, the system relies on Dialogic hardware, including, voice boards, Antares cards (for speech recognition and fax) and digital switching cards. The system also uses the SCSA extended bus. The Purespeech ASR algorithms, which are used for speech recognition, run on the Antares cards plugged into the computers running the Solaris OS.

The system combines state-of-the-art speech recognition, computer and telephony technology. Along with the ability to recognize an extensive set of simple, intuitive, speaker-independent speech commands and respond by performing a wide variety of complex tasks. Each subscriber has their own secure Web page on which all the features can be accessed, allowing almost every aspect of the present invention to be maintained on-line.

Subscribers can use voice commands to (i) build, edit and manage their contact lists, (ii) review, play back, read, reply to and/or reroute voice mail and e-mail, (iii) schedule conference calls with 800 number access, and (iv) maintain an itemized calling log listing all calls with a running total of all charges.

The system also transfers calls as instructed or upon command will follow the subscriber according to predetermined contact numbers for office, home, cellular, pager or other designated locations. Every time a subscriber calls in, the system logs the originating number for the inbound call and then uses that number to re-contact the subscriber.

In accordance with the present invention, every subscriber or participant is given their own 800 number that is then used by all contacts calling in to the subscriber. The 800 number can also be used in scheduling conference calls for up to 32 participants on a given day and time. Each participant uses the 800 number and calls in to join the conference call, thereby effecting call conferencing for a fraction of the cost otherwise incurred.

Basically, the system provides a unified solution to the many varied communications and messaging devices used daily by mobile professionals and active consumers. With simple voice commands, subscribers can easily access and respond to all of their communications and messaging media in the same session.

The system takes inbound calls and contacts the subscriber, using call transfer or follow me features, and advises the subscriber of the call, the number of the calling party and/or the callers identity from the subscribers contact list.

If the subscriber is on the telephone, the system will whisper the pending call information, giving the subscriber the option of taking the call or sending the caller into voice mail. The subscriber can also set priorities for certain calls which the system will follow, permitting selected calls to be put on call waiting, transferred or directed through call forwarding, while other calls are direct to voice mail messaging. Subscribers can conveniently make calls from their contact list by voice commands giving the contacts name and, if applicable, the location to be called (i.e. "home," "office," "cellular," etc.)

Subscribers can access and play back their voice mail from any telephone or from their personal Web page. Voice mail messages can be saved, retrieved, deleted or rerouted to other individuals, groups or broadcast and voice responses can be returned immediately to the caller. Also, e-mail messages can be viewed on the subscriber's personal home page or the system will read the e-mail to the subscriber from any telephone using text-to-speech technology. Subscribers can immediately respond to e-mail with voice messages, marking, saving or deleting messages during the same session. E-mail messages can also be sent to any fax machine. Further, subscribers can immediately respond to faxes rather than waiting to retrieve copies and delay responses. Incoming faxes are received, the subscriber is notified of the arrival of the new fax, the fax can then be stored for later viewing and/or redirected to any fax machine or e-mail address from the subscribers contact list or any other number. Subscribers can also be notified of any incoming communications and messages by pager, whether an inbound call, voice mail, e-mail or fax.

The system will automate conference calling and eliminate the need for conference call operators or complex, confusing PBX systems. The subscriber remains in control and can add or drop callers, mute the call and otherwise control all aspects of the conference call. By pre-scheduling conference calls by date and time, subscribers can notify participants, giving them an 800 number to call and join the conference. Up to 32 participants can be included in the present conference call feature.

The system further acts as an efficient secretary retaining complete contact logs of all call statistics. The subscriber maintains the contact list using simple voice or keyboard commands and can establish contact groups for broadcast communications and setting up conference calls. The contact database is easily accessible to all features.

The system includes a feature which enables subscribers to retrieve on demand or at predetermined intervals selected information from the internet or on-line service providers, allowing subscribers to establish "filter and forward" criteria specifying the type of information desired. A search engine will then retrieve the requested information, transmit the information to the system platform and notify the subscriber by page, telephone or other desired means. The system will provide direct access to news, weather, sports, financial, travel and other custom content directly from a computer or any telephone. The subscriber will then access the information by all available options, including text-to-speech capabilities.

The system provides long distance and international calling over the internet through the subscriber's personal home page, thereby significantly reducing the costs of long distance and international calling. The system further provides video conferencing features.

It is to be understood that the form of this invention is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. A unified-messaging network for managing, sending and receiving user-level messages relating to a first user of the unified-messaging network, said unified-messaging network utilizing both at least one telephone connection and at least one internet connection, said user-level messages sent to and received from a plurality of communication networks employing a plurality of communication protocols, comprising:

a first-voice server in a first cluster of voice servers, said first-voice server comprising:
telephony hardware coupling said at least one telephone connection to at least one application with a first capability to identify one or more user events based on user input from an electronic device of the first user passed through said at least one telephone connection, said at least one application having a second capability to create and to transmit a plurality of telephony-related network messages to at least one of a plurality of second servers;
an internet-connection interface for establishing an internet connection and including a third capability to create and to transmit a plurality of internet-related network messages to at least one other server of the plurality of second servers; and
a cluster-switching and resource-allocation device coupled to said telephony hardware and said internet-connection interface, said cluster-switching and resource-allocation device including a first computing capability to process said telephony-related network messages and said internet-related network messages, said telephony-related network messages and said internet-related network messages created to enable the managing, sending and receiving of said user-level messages;

said plurality of second servers coupled to said first-voice server and responsive to said telephony-related network messages and said internet-related network messages, said plurality of second servers interfacing each other through the telephony-related network messages or the internet-related network messages executed under control of the cluster-switching and resource-allocation device to at least one of receive a first user-level message from and transmit a first user-level message to said electronic device of the first user over at least one of the telephone connection and the internet connection, the first user-level message received from or sent to said electronic device associated with the first user and using a first network protocol from a plurality of network protocols associated with said at least one of the telephone connection and the internet connection, the plurality of second servers further comprising:
at least one database server for storage of data relating to the first user for use in performing a voice-enabled task for the first user and a file server coupled to the database server, at least one of the file server and the database server accessible to the first user to manage an account including stored data associated with the first user including one or more setting options to send and to receive the user-level messages according to a preference of the first user, at least one of said database server and said file server accessible to said first-computing capability of said cluster-switching and resource-allocation device, wherein said cluster-switching and resource-allocation device processes said plurality of telephony-related network messages and said plurality of internet-related network messages with a capability to reference at least one of said database server and said file server; and at least one web server coupled to the internet-connection interface of the first-voice server with a second-computing capability and adapted to provide access to the first user over the internet connection; and one or more additional voice servers coupled to the first-voice server in the cluster of voice servers, at least one of first-voice server and the one or more additional servers further comprising:

an interactive speaker-independent, phoneme-based speech recognition device coupled to the cluster-switching and resource-allocation device and with a capability to receive a natural speech input at least over the telephone connection and to process the received natural speech input using phoneme-based speech recognition and to initiate execution of a voice-enabled task for the first user, based at least in part on the natural speech input, the interactive speaker-independent, phoneme-based speech recognition device adapted to recognize a plurality of natural speech commands and adapted to automatically trigger execution of a plurality of different voice-enabled tasks, each voice-enabled task corresponding to at least one specific natural speech command, and adapted to initiate the first user-level message in a manner relating to the voice-enabled task and a second user-level message, such that the first user-level message is transmittable over the telephone connection and over the internet connection to at least one electronic device designated by the first user, the electronic device being any one of at least a computer and a mobile device, and the first computing capability of said cluster-switching and resource-allocation device adapted to control processing of the second user-level message and to initiate transmission of the second user-level message at least by the internet connection to at least one of the mobile device in text format and to the computer or the mobile device in email format.

2. The unified-messaging network according to claim 1, further comprising: the first cluster of voice servers interconnected by a voice bus and the plurality of second servers including the file server and the database server interconnected by an internal network accessible by the first-voice server having the interactive speaker-independent, phoneme-based speech recognition device.

3. The unified-messaging network according to claim 1, wherein the voice-enabled task relates to at least a portion of the data stored for the first user in at least one of the file server and the database server.

4. The unified-messaging network according to claim 1, wherein the telephony hardware is adapted to receive an input provided by the first user by a DTMF signal, from said at least one electronic device associated with the first user and wherein the voice-enabled task is executable based at least in part on the DTMF signal received from said electronic device of the first user in addition to the natural speech input.

5. The unified-messaging network according to claim 1, wherein the voice-enabled task facilitates management by the first user of, at least one of a contact, a user profile, an email, a voicemail, a video, a telephone call, a facsimile, and a text message on at least one of said electronic device, the file server, and the database server.

6. The unified-messaging network according to claim 1, wherein the voice-enabled task uses stored data for the first user in at least one of the database server and the file server to perform for the first user, at least one action from a group of actions including: a telephone call, an email, a voicemail, a fax, a text message, a conference call, and a video conference.

7. The unified-messaging network according to claim 1, wherein the natural speech input is received from an electronic communication from the first user over an internet connection coupled to at least one of said first-voice server and said additional voice servers, the natural speech input conveyed using an Internet Protocol (IP) address to identify an internet location.

8. The unified-messaging network according to claim 1, wherein the first-voice server in the unified-messaging network is configured to transmit an electronic message to the electronic device of said first user, via both IP and non-IP transmission protocols over the network.

9. The unified-messaging network of claim 1, wherein said electronic device of the first user further initiates access, by at least the natural speech input, to a plurality of call-processing features including at least one of: playing voicemail, reading an email or using text-to-speech to convert and listen to the email over the telephone, reading a fax, managing a contact, managing a schedule, and setting options for a plurality of features that execute particular functions including sending and receiving messages, faxes, and email, managing stored data, setting the parameters for outgoing calls, and setting up conferences.

10. The unified-messaging network according to claim 9, wherein said computing ability of said web server provides access by said electronic device of said first user to a plurality of webpages on a website, said website accessible through an internet firewall and a security program, and at least one of said plurality of webpages providing said call-processing features.

11. The unified-messaging network according to claim 10, wherein said website provides a single point of access for said first user to access said user-level messages through said electronic device of said first user.

12. The unified-messaging network according to claim 10, further comprising: an additional private telephone connection and an extranet firewall for certain users to access the web server via said extranet firewall.

13. The unified-messaging network of claim 1, wherein the plurality of communication networks includes at least the Internet.

14. The unified-messaging network of claim 1, wherein the plurality of communication networks includes at least a local-area network.

15. The unified-messaging network of claim 1, wherein the options are configured by said electronic device for the first user in response to menu prompts to indicate at least one of a location and a communication device at which the first user wants to receive user-level messages.

16. The unified-messaging network of claim 1, further comprising a plurality of telecommunication applications to implement an application programming interface (API) usable by said telecommunication applications for a plurality of access protocols.

17. The unified-messaging network according to claim 1, further comprising:

a text-to-speech device coupled to at least the web server and the first-voice server, wherein during a session on a website, accessible over the internet connection, said text-to-speech device receives text input relating to said first user and co-relates said text input to stored phonemes to create a speech output delivered to said first user over said electronic device of said first user.

18. The unified-messaging network according to claim 17, wherein said text-to-speech device converts said email into a speech output for said electronic device to enable a user to listen to said speech output over the electronic device.

19. The unified- messaging network according to claim 1, wherein said email is displayable on said computer and said computer has a capability to accept a user response to said email and transmit said user response to one or more user contacts with audio by using an audio attachment.

20. The unified-messaging network according to claim 1, wherein the preference of the first user includes selecting incoming calls for at least one of call waiting, transferring or directing through call forwarding, and transmission directly to voice mail messaging.

21. The unified-messaging network according to claim 1, further comprising:
a device adapted to receive a user voicemail over said telephone connection and deliver said voicemail via streaming audio over said internet connection.

22. The unified-messaging network according to claim 1, wherein said natural speech input relates to said voice-enabled task and a tag, said tag associated with contact data stored in said database, said contact data including at least a location for a user.

23. The unified messaging network according to claim 1, wherein the natural speech input enables at least one of review, play back, read, reply to and reroute a user-level message received over at least one of said telephone connection and said internet connection.

24. The unified-messaging network according to claim 1, wherein the setting options include sending and receiving said user-level messages including at least one of faxes and email, managing said contact data on said database server, setting up conferences, and setting at least one of a greeting and a security code.

25. A unified-messaging-network method for managing, sending and receiving user-level messages relating to a first user, by using both telephone and internet connections, over a plurality of networks, comprising:
interconnecting a plurality of voice servers in a cluster with a voice bus, the plurality of voice servers including a first-voice server including a cluster-switching and resource-allocation device;
configuring the first-voice server to receive user input from an electronic device passed through at least one of a telephone connection and an internet connection, and to use at least one telephony application for processing user input passed through the telephone connection, said at least one telephony application with a first capability to identify one or more user events based on the user input and a second capability to create and to transmit a plurality of telephony-related network messages to at least one of a plurality of second servers by a first network protocol from a plurality of network protocols associated with the one of a plurality of networks and the telephone connection and to use at least one other application for the user input passed through the internet connection, the at least one other application with a third capability to create and to transmit a plurality of internet-related network messages to at least one other server of the plurality of second servers by a second network protocol from said plurality of network protocols associated with another one of the plurality of networks, and to use said cluster-switching and resource-allocation device including a first computing capability to process the telephony-related network messages and the internet-related network messages to enable the managing, sending, and receiving of said user-level messages relating to said first user;
interconnecting a database server with the first-voice server for storage of data relating to the first user for use in performing a task for the first user;
interconnecting a file server with the database server and the first-voice server, the file server providing access to the first user via said electronic device to manage an account associated with the first user including setting options for sending and receiving the user-level messages according to a preference of the first user;
interconnecting a web-server with said first-voice server, said database server and said file server and providing access for the first user, so that the first user can access the network via said electronic device using at least one of a plurality of the internet protocols including http protocol, over the internet connection; and
configuring at least the first-voice server to include an interactive speaker-independent phoneme-based speech recognition capability, said interactive speaker-independent phoneme-based speech recognition capability capable of receiving a natural speech input at least by the telephone connection, said first-voice server adapted to process the natural speech input received based on phoneme-based speech recognition and to initiate execution of the task for the first user, based at least in part on the natural speech input, the interactive speaker-independent phoneme-based speech recognition capability adapted to recognize a plurality of natural speech commands and adapted to automatically trigger execution of a plurality of different voice-enabled tasks, each voice-enabled task corresponding to a specific natural speech command, and to initiate transmission of a second user-level message relating to the voice-enabled task or the first user-level message to any one of a computer and a mobile device, the computing capability of said cluster-switching and resource-allocation device adapted to process the second user-level message and to initiate transmission by the internet connection to at least one of the mobile device in a text format and to the computer or the mobile device in an email format.

26. The unified-messaging-network method according to claim 25, wherein the file server and the database server are connected to an internal network.

27. The unified-messaging-network method according to claim 25, wherein the task relates to at least a portion of the data stored for the first user in at least one of said file server and said database server.

28. The unified-messaging-network method according to claim 25, wherein the user input includes a DTMF signal and wherein the voice-enabled task is executable based at least in part on the DTMF signal in addition to the natural speech input.

29. The unified-messaging-network method according to claim 25, wherein the voice-enabled task facilitates management by the first user of, at least one of a contact, a user profile, an email, a voicemail, a video, a telephone call, a facsimile, and a text message on at least one of said electronic device, said file server, and said database server.

30. The unified-messaging-network method according to claim 25, wherein the task uses stored data for the first user in at least one of the database server and the file server to perform for the first user, at least one action from a group of actions including: a telephone call, an email, a voicemail, a fax, a text message, a conference call, and a video conference.

31. The unified-messaging-network method according to claim 25, wherein the natural speech input is received from an electronic communication from the user over an internet connection coupled to at least one of said first-voice server and said additional servers, the natural speech input conveyed using an Internet Protocol (IP) address to identify an internet location.

32. The unified-messaging-network method according to claim 25, wherein the first-voice server in the unified network is configured to transmit an electronic message to the electronic communication of said first user, via both IP and non-IP transmission protocols over the network.

33. The unified-messaging-network method of claim 25, further comprising: making a plurality of call-processing features accessible to the first user, by at least the natural speech input, including at least one of: playing voicemail, reading an email or using text-to-speech to convert and listen to the email over the telephone, reading a fax, managing a contact, managing a schedule, and setting options for a plurality of features that execute particular functions including sending and receiving messages, faxes, and email, managing stored data, setting the parameters for outgoing calls, and setting up conferences.

34. The unified-messaging-network method of claim 25, wherein the plurality of communication networks includes at least the Internet.

35. The unified-messaging-network method of claim 25, wherein the plurality of communication networks includes at least a local-area network.

36. The unified-messaging-network method of claim 25, wherein the options are configured by said electronic device of the first user through menu prompts to specify at least one of a location and a communication device at which the first user wants to receive the messages.

37. The unified-messaging-network method of claim 25, wherein the at least one other application implements an application programming interface (API) which is used by the application for a plurality of access protocols.

38. A method of unified messaging over a network to process user-level communications over at least one telephone connection and at least one internet connection, said user-level communications sent to and received from a plurality of communication networks using a plurality of communication protocols, comprising:

receiving at a first-voice server, user input passed through at least one of a telephone connection and an internet connection, using a first application of the first-voice server to identify a user event passed through said telephone connection and using a second application of the first-voice server to identify a user event passed through said internet connection, and using a first capability of said first application to generate and send a plurality of telephony-related network messages to at least one of a plurality of servers coupled to said first-voice server and using a second capability of said second application having a second capability to generate and send a plurality of internet-related network messages to at least one other server of said plurality of servers;

selectively switching among said plurality of servers based on said telephony-related network messages and said internet-related network messages to control the transmission of at least one user-level message and a notification relating to the user-level message over at least the internet connection to at least one user device designated to receive user-level messages; and receiving a natural speech input over said telephone connection and processing said natural speech input based on phoneme-based recognition to initiate execution of a voice-enabled task, said voice-enabled task generating said at least one user-level message and said notification and initiating transmission of said user-level message in at least one of a telephony-specific audio format over said telephone connection and a computer-specific audio format over said internet connection and said notification in text format over said internet connection to said user device.

39. The method of unified messaging according to claim 38, wherein the natural speech input enables at least one of review, play back, read, reply to, and reroute of a user-level message received over at least one of said telephone connection and said internet connection.

40. The method of unified messaging according to claim 38, further comprising:

providing a plurality of setting options, by which a user can designate sending and receiving options of said user-level messages including at least one of faxes and email, managing said contact data on a database associated with said voice server, setting up conferences, and setting at least one of a greeting and a security code.

41. The method of unified-messaging according to claim 38, further comprising:

coupling a text-to-speech device to said voice server to convert at least one of said user-level messages including an email into a speech output for said electronic device to enable a user to listen to said speech output over the electronic device.

42. The method of unified messaging according to claim 38, further comprising:

using a computing ability of said web server to provide access by said electronic device of said first user to a plurality of webpages on said website, and making said website accessible through an internet firewall and a security program, and using at least one of said plurality of webpages to provide a plurality of call-processing features relating to said user-level messages.

43. The method of unified messaging according to claim 38, wherein said website provides a single point of access for said first user to access said user-level messages through said electronic device of said first user.

44. The method of unified messaging according to claim 38, further comprising:

providing a text-to-speech device and using said text-to-speech device to convert an email into a speech output for said electronic device to enable a user to listen to said speech output over the electronic device.

* * * * *